US012423910B2

(12) United States Patent
Furko et al.

(10) Patent No.: US 12,423,910 B2
(45) Date of Patent: Sep. 23, 2025

(54) 3D WRIST TRACKING

(71) Applicant: Snap Inc., Santa Monica, CA (US)

(72) Inventors: Roman Furko, Marina del Rey, CA (US); Vladyslav Horbatiuk, Kyiv (UA); Amir Iagudin, Moscow (RU); James Supancic, III, Irvine, CA (US)

(73) Assignee: SNAP INC., Santa Monica, CA (US)

( * ) Notice: Subject to any disclaimer, the term of this patent is extended or adjusted under 35 U.S.C. 154(b) by 118 days.

(21) Appl. No.: 18/061,752

(22) Filed: Dec. 5, 2022

(65) Prior Publication Data

US 2024/0185512 A1 Jun. 6, 2024

(51) Int. Cl.

| | |
|---|---|
| ***G06T 15/20*** | (2011.01) |
| ***G06T 7/246*** | (2017.01) |
| ***G06T 19/00*** | (2011.01) |
| ***G06V 20/20*** | (2022.01) |
| ***G06V 20/40*** | (2022.01) |
| ***G06V 40/10*** | (2022.01) |

(52) U.S. Cl.

CPC ............ *G06T 15/205* (2013.01); *G06T 7/246* (2017.01); *G06T 19/006* (2013.01); *G06V 20/20* (2022.01); *G06V 20/46* (2022.01); *G06V 40/107* (2022.01); *G06T 2207/10016* (2013.01); *G06T 2207/30196* (2013.01); *G06T 2215/16* (2013.01)

(58) Field of Classification Search

CPC ..... G06T 15/205; G06T 7/246; G06T 19/006; G06T 2207/10016; G06T 2207/30196; G06T 2215/16; G06V 20/20; G06V 20/46; G06V 40/107

See application file for complete search history.

(56) References Cited

U.S. PATENT DOCUMENTS 7,971,156 B2 6/2011 Albertson et al.
7,996,793 B2 8/2011 Latta et al.
8,487,938 B2 7/2013 Latta et al.
(Continued)

FOREIGN PATENT DOCUMENTS

CN 103049761 B 8/2016
EP 3707693 A1 9/2020
(Continued)

OTHER PUBLICATIONS

"International Application Serial No. PCT/US2023/082313, International Search Report mailed Mar. 19, 2024", 4 pgs.
(Continued)

*Primary Examiner* — Michelle L Sams
(74) *Attorney, Agent, or Firm* — SCHWEGMAN LUNDBERG & WOESSNER, P.A.

(57) ABSTRACT

A wrist tracking process is provided for use in Augmented Reality (AR) applications. A computing system captures video frame tracking data of a wrist of a user and generates 3D parameter data of the user's wrist based on the video frame tracking data. The computing system generates 3D render data of a virtual item based on the 3D parameter data of the user's wrist, and 3D model data of a physical item represented by the virtual item. The computing system generates video frame AR data based on the 3D render data and the video frame tracking data. The computing system provides an AR user interface to the user based on the video frame AR data.

17 Claims, 16 Drawing Sheets

(56) References Cited

U.S. PATENT DOCUMENTS

| | | | |
|---|---|---|---|
| 8,856,691 B2 | 10/2014 | Geisner et al. | |
| 9,225,897 B1 | 12/2015 | Sehn et al. | |
| 9,230,160 B1 | 1/2016 | Kanter | |
| 9,276,886 B1 | 3/2016 | Samaranayake | |
| 9,705,831 B2 | 7/2017 | Spiegel | |
| 9,742,713 B2 | 8/2017 | Spiegel et al. | |
| 10,102,423 B2 | 10/2018 | Shaburov et al. | |
| 10,284,508 B1 | 5/2019 | Allen et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 2009/0012788 A1 | 1/2009 | Gilbert et al. | |
| 2011/0301934 A1 | 12/2011 | Tardif | |
| 2012/0249416 A1 | 10/2012 | Maciocci et al. | |
| 2013/0063487 A1* | 3/2013 | Spiegel .................. | G06Q 30/02 345/633 |
| 2014/0171036 A1 | 6/2014 | Simmons | |
| 2014/0279242 A1* | 9/2014 | Staicut ............... | G06Q 30/0643 705/26.61 |
| 2015/0120293 A1 | 4/2015 | Wohlert et al. | |
| 2015/0370320 A1 | 12/2015 | Connor | |
| 2016/0026253 A1 | 1/2016 | Bradski et al. | |
| 2017/0123487 A1 | 5/2017 | Hazra et al. | |
| 2017/0277684 A1 | 9/2017 | Dharmarajan Mary | |
| 2017/0277685 A1 | 9/2017 | Takumi | |
| 2017/0351910 A1 | 12/2017 | Elwazer et al. | |
| 2018/0158370 A1 | 6/2018 | Pryor | |
| 2020/0013182 A1* | 1/2020 | Sompura ................... | G06T 7/62 |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0197459 A1* | 6/2022 | Tashjian ............. | G06Q 30/0643 |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0326781 A1 | 10/2022 | Hwang et al. | |
| 2022/0334649 A1 | 10/2022 | Hwang et al. | |

FOREIGN PATENT DOCUMENTS

| | | | |
|---|---|---|---|
| KR | 20220158824 | A | 12/2022 |
| WO | WO-2016168591 | A1 | 10/2016 |
| WO | WO-2019094618 | A1 | 5/2019 |
| WO | WO-2022005687 | A1 | 1/2022 |
| WO | WO-2022005693 | A1 | 1/2022 |
| WO | WO-2022060549 | A2 | 3/2022 |
| WO | WO-2022066578 | A1 | 3/2022 |
| WO | WO-2022132381 | A1 | 6/2022 |
| WO | WO-2022146678 | A1 | 7/2022 |
| WO | WO-2022198182 | A1 | 9/2022 |
| WO | WO-2022216784 | A1 | 10/2022 |
| WO | WO-2022225761 | A1 | 10/2022 |
| WO | WO-2022245765 | A1 | 11/2022 |
| WO | WO-2024123684 | A1 | 6/2024 |

OTHER PUBLICATIONS

"International Application Serial No. PCT/US2023/082313, Written Opinion mailed Mar. 19, 2024", 6 pgs.

IQBAL, Umar, et al., "Hand Pose Estimation via Latent 2.5D Heatmap Regression", arXiv:1804.09534v1 [cs.CV], (Apr. 25, 2018), 20 pgs.

Moon, Gyeongsik, et al., "I2L-MeshNet: Image-to-Lixel Prediction Network for Accurate 3D Human Pose and Mesh Estimation from a Single RGB Image", arXiv:2008.03713v2 [cs.CV], (Nov. 1, 2020), 23 pgs.

Moon, Gyeongsik, et al., "InterHand2.6M: A Dataset and Baseline for 3D InteractingHand Pose Estimation from a Single RGB Image", arXiv:2008.09309v1 [cs.CV], (Aug. 21, 2020), 29 pgs.

* cited by examiner

3D WRIST TRACKING

TECHNICAL FIELD

The present disclosure relates generally to user interfaces and more particularly to user interfaces used for ecommerce.

BACKGROUND

Online shoppers enjoy the convenience of online shopping but may also want a way to try on merchandise before making a purchase. Therefore, convenient processes for virtually interacting with products offered online are desirable.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
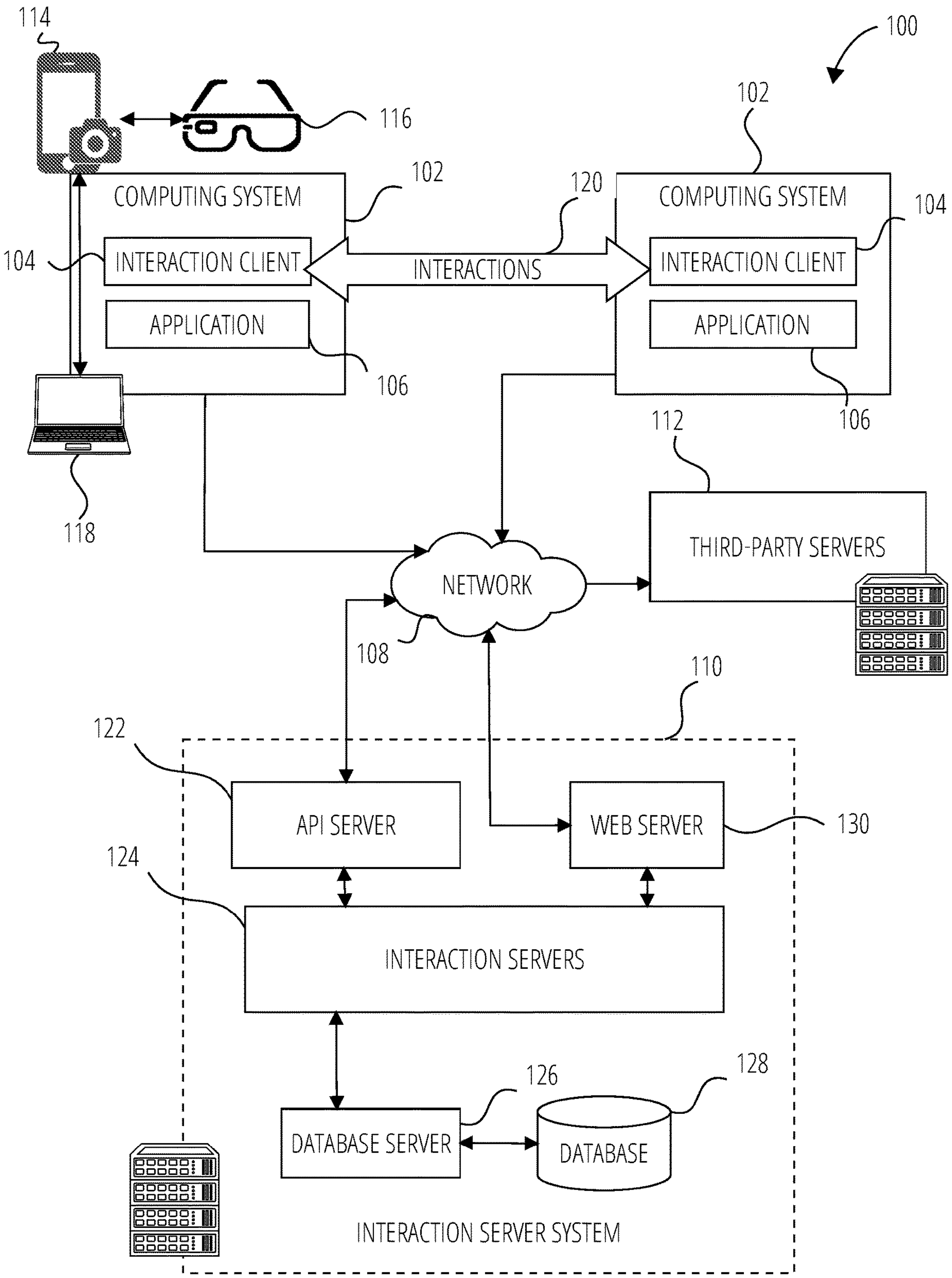
FIG. 1 is a diagrammatic representation of a networked environment in which the present disclosure may be deployed, according to some examples.

Shoppers enjoy shopping online but also desire to try on various physical items before making a purchase, such as trying on wrist watches and bracelets. In some existing shopping experiences, a user attaches a wristband having indexing marks around the user's wrist and takes a video of the user's wrist wearing the wristband. A virtual item representing the physical item is projected onto images of the user's wrist using the indexed wristband to determine an orientation and rotation of the virtual item. This methodology has several disadvantages including that a physical wristband must be provided through some form of physical distribution channel, such as by mail or catalog inserts. Another disadvantage is that the user may wear the indexed wristband incorrectly, use an incorrect wristband, or use an indexed wristband with damaged or obscured indexing.

The present disclosure pertains to methodologies to "try on" a virtual item representing a physical item that operate without an indexed wristband. A user captures video of the user's wrist using a computing system. The computing system determines 3D parameters of the user's wrist using image processing methodologies. The computing system generates an augmentation applied to the captured video adding a virtual item representing a physical item to the video of the user's wrist. The virtual item's orientation and rotation matches that of the user's wrist in real-time and the user can move and rotate their wrist to see how the physical item will look on their wrist.

In some examples, the computing system captures video frame tracking data of a wrist of a user and generates 3D parameter data of the wrist based on the video frame tracking data. The computing system generates 3D render data of a virtual item based on the 3D parameter data of the wrist and 3D model data of a physical item represented by the virtual item. The computing system generates video frame AR data based on the 3D render data and the video frame tracking data and provides an AR user interface to the user based on the video frame AR data.

In some examples, the computing system generates feature map data including 3D coordinate data of visual features of the wrist of the user based on the video frame tracking data, and generates intermediate 3D parameter vector data based on the feature map data.

In some examples, the computing system captures, using one or more distance sensors of the computing system, distance data of the wrist of the user, and generates the 3D parameter data based on the video frame tracking data and the distance data.

In some examples, the computing system generates a projection of the 3D parameter data onto an image of the user's wrist and determines a 2D loss or error based on differences between the 2D projection and the image of the user's wrist. The computing system uses the 2D loss to correct the 3D parameter data.

Other technical features may be readily apparent to one skilled in the art from the following figures, descriptions, and claims.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple computing systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other computing systems 102), an interaction server system 110 and third-party servers 112). An interaction client 104 can also communicate with locally hosted applications 106 using Applications Program Interfaces (APIs).

Each computing system 102 may comprise one or more user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a computing system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the computing systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a computing system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 10.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the computing system 102 (e.g., a "native app"), or a small-scale version of the application (e.g., an "applet") that is hosted on the computing system 102 or remote of the computing system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the computing system 102 can be launched independently of and separately from the interaction client 104, such as by selecting an icon corresponding to the application 106 on a home screen of the computing system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the computing system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the computing system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2A:
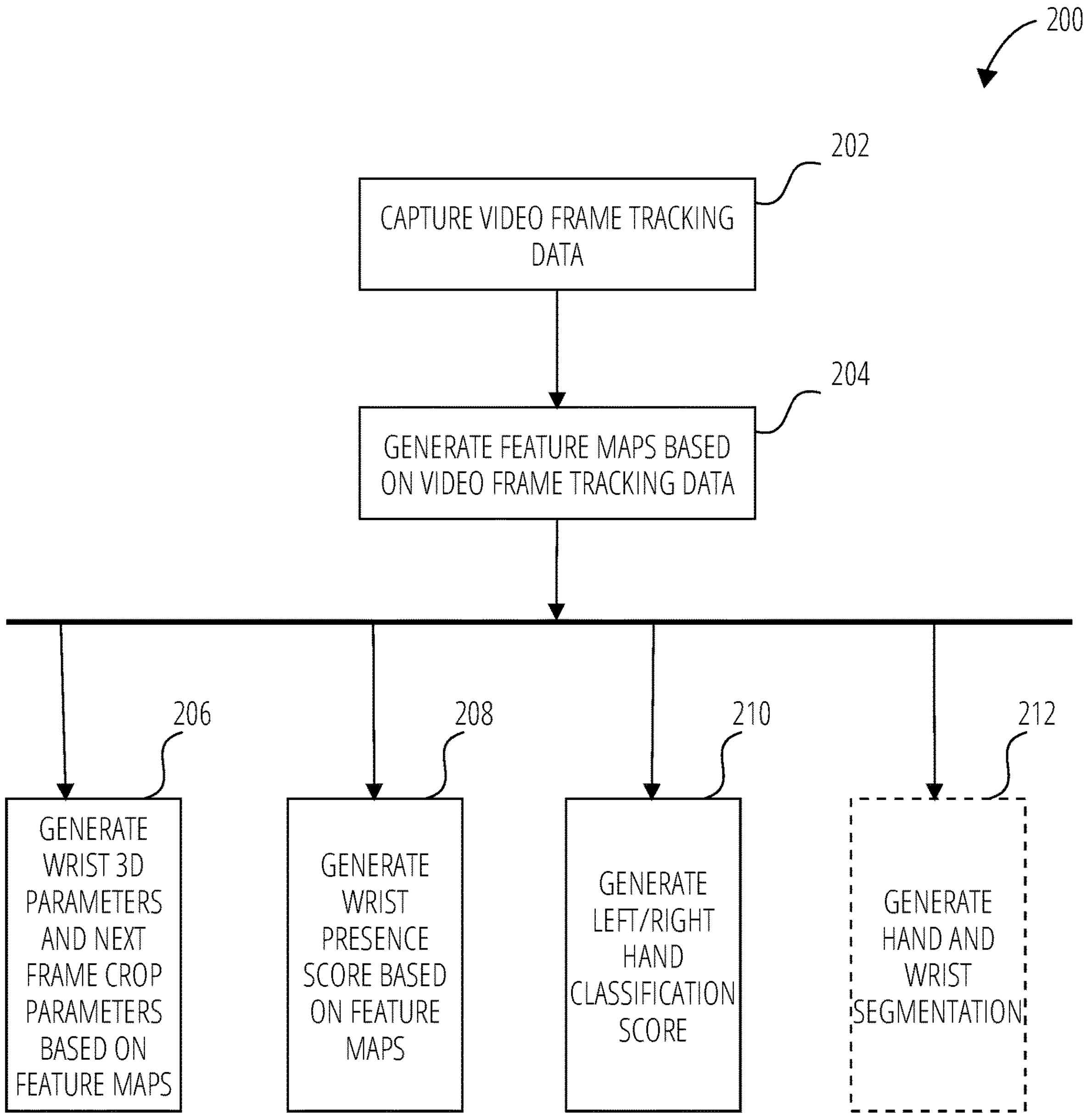
FIG. 2A is an activity diagram of a wrist tracking method according to some examples.
Figure 2B:
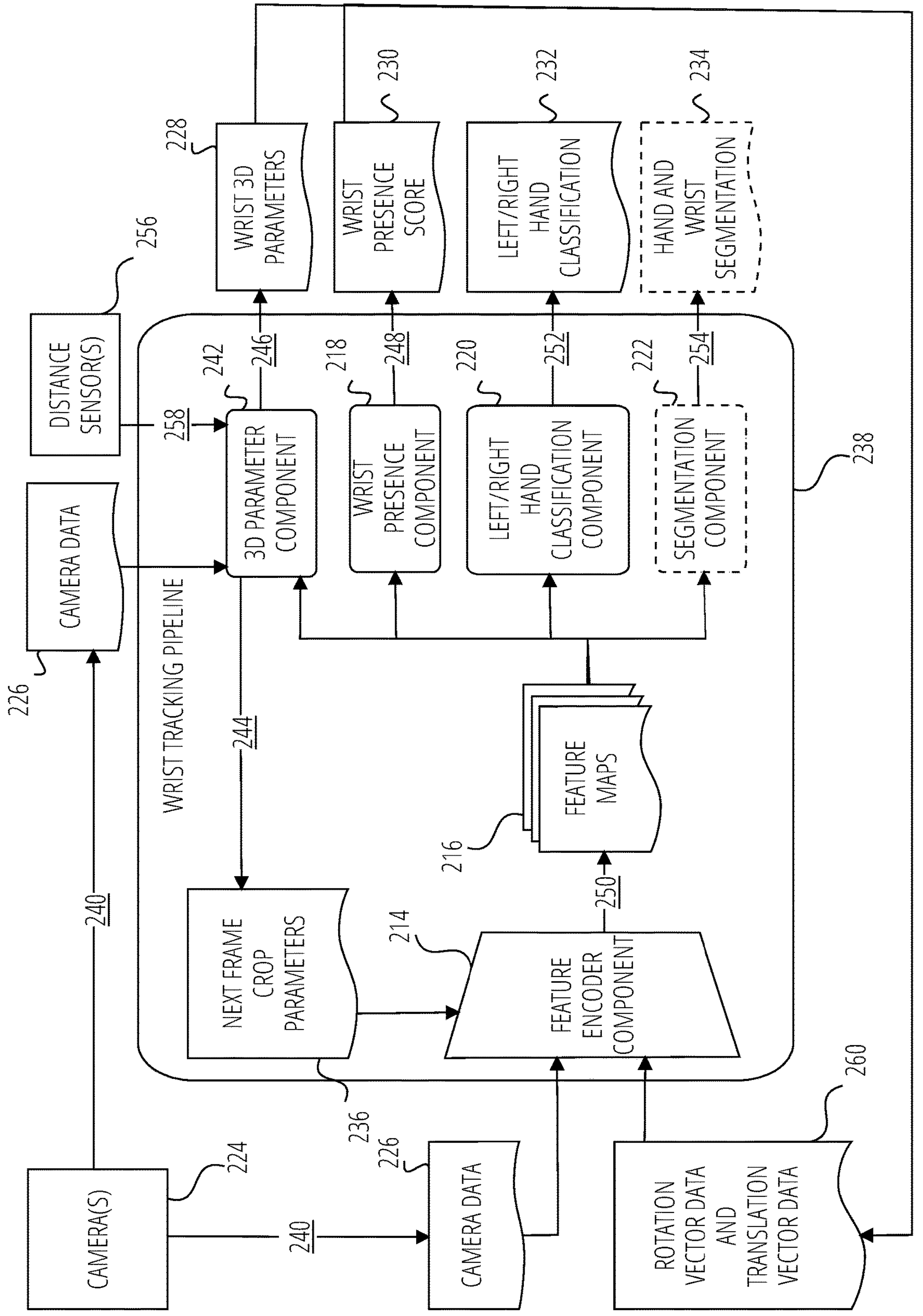
FIG. 2B is a collaboration diagram of a wrist tracking pipeline according to some examples.

FIG. 2A is an activity diagram of a wrist tracking method 200 and FIG. 2B is a collaboration diagram of a wrist tracking pipeline 238 according to some examples. A computing system, such as computing system 102, implements the wrist tracking method 200 using components of the wrist tracking pipeline 238 to identify a user's wrist in image or video frame data captured by one or more cameras of the computing system and generate one or more sets of parameters that are used by AR applications of the computing system to provide user interfaces to the user of the computing system.

In operation 202, the computing system uses one or more cameras 224 of the computing system to capture video frame tracking data 240 of the user's wrist. The video frame tracking data 240 includes video frame data captured using the one or more cameras 224 of portions of the user's forearm, wrist, and hand as the user takes video images of their wrist while interacting with a user interface of an AR application. The one or more cameras 224 communicate the video frame tracking data 240 as part of camera data 226 to various components of the wrist tracking pipeline 238.

In some examples, the video frame tracking data 240 comprises stereoscopic video frame tracking data captured by two or more spaced-apart cameras of the one or more cameras 224. In some examples, the video frame tracking data 240 comprises monoscopic video frame tracking data captured by a single camera of the one or more cameras 224.

In some examples, one or more distance sensors 256 capture distance data 258 of a distance between a camera and the user's forearm, wrist, and hand when a single camera is used to capture monoscopic video frame tracking data. The wrist tracking pipeline 238 uses the distance data 258 when generating 3D models of portions of the user's forearm, wrist, and hand in conjunction with the monoscopic video frame tracking data. In some examples, a distance sensor comprises an ultrasonic distance sensor, an infrared distance sensor, a LIDAR distance sensor, an LED time of flight sensor, or the like.

In operation 204, the feature encoder component 214 receives the camera data 226 and generates feature map data 250 included in one or more feature maps 216 based on the camera data 226 and next frame crop parameters 236. The feature map data 250 of the feature maps 216 include data of visual features of portions of the user's forearm, wrist and hand that are extracted by the feature encoder component 214. The feature map data 250 includes 2D or 3D coordinates of visual features of the user's forearm, wrist, and hand recognized from the video frame tracking data 240, such as, but not limited to, prominent portions of the metacarpal bones, carpal bones, the ulna, and the radius, and the outer contours or edges of portions of the user's forearm, wrist, and hand. For example, the feature encoder component 214 receives the video frame tracking data 240 and crops individual video frames included in the camera data 226 based on the next frame crop parameters 236. The cropping reduces an amount of the video frame tracking data 240 that the feature encoder component 214 processes. In some examples, cropping increases a ratio between an area of a wrist portion in an input image and a total input image area. Increasing the ratio may allow increased accuracy in tracking a wrist as an input image is resized to a fixed smaller resolution, and having the wrist occupy a larger portion in the input image facilitates wrist tracking.

The feature encoder component 214 extracts the feature map data 250 from the cropped video frame tracking data 240 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. In some examples, the feature encoder component 214 extracts data of the feature maps 216 using artificial intelligence methodologies and a feature map model previously generated using machine learning methodologies. In some examples, a feature model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, and the like.

In some examples, the feature encoder component 214 generates stereoscopic 3D feature map data based on stereoscopic video frame tracking data included in the camera data 226. The feature encoder component 214 includes the stereoscopic 3D feature map data in the feature map data 250. In some examples, the feature encoder component 214 generates monoscopic 2D feature map data based on monoscopic video frame tracking data included in the camera data 226. The feature encoder component 214 includes the monoscopic 2D feature map data in the feature map data 250.

In operation 206, a 3D parameter component 242 of the wrist tracking pipeline 238 generates wrist 3D parameter data 246 included in wrist 3D parameters 228 and next frame crop data 244 included in the next frame crop parameters

Figure 3A:
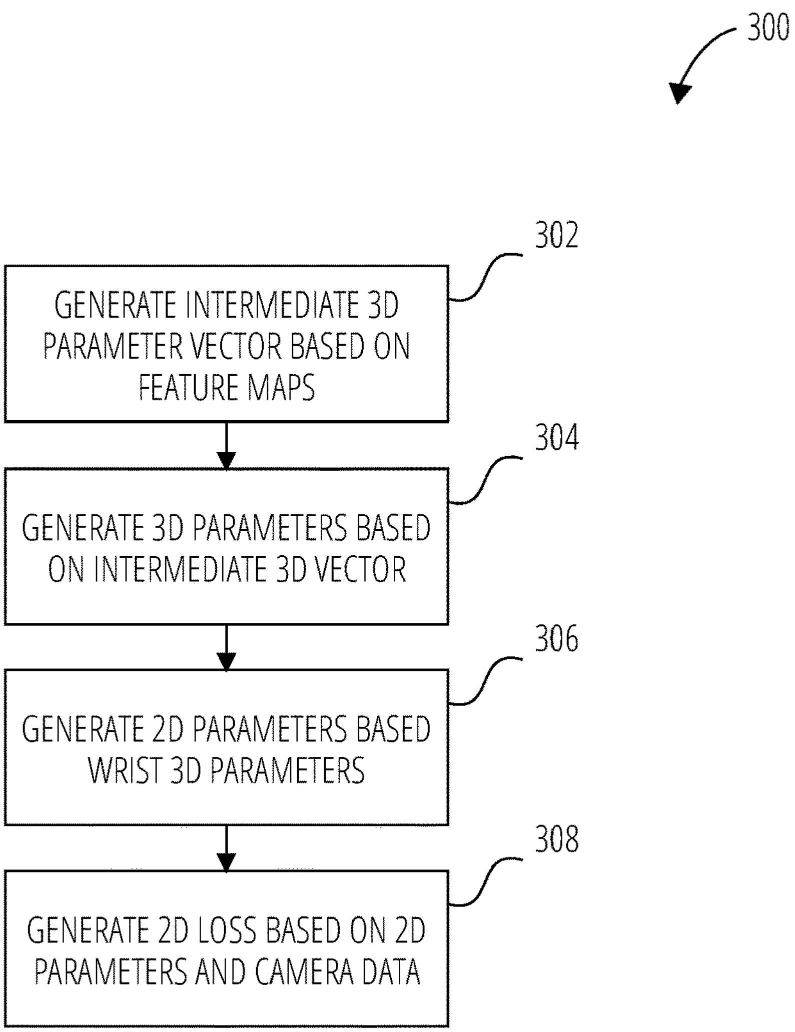
FIG. 3A is an activity diagram of a 3D parameter generation method according to some examples.
Figure 4A:
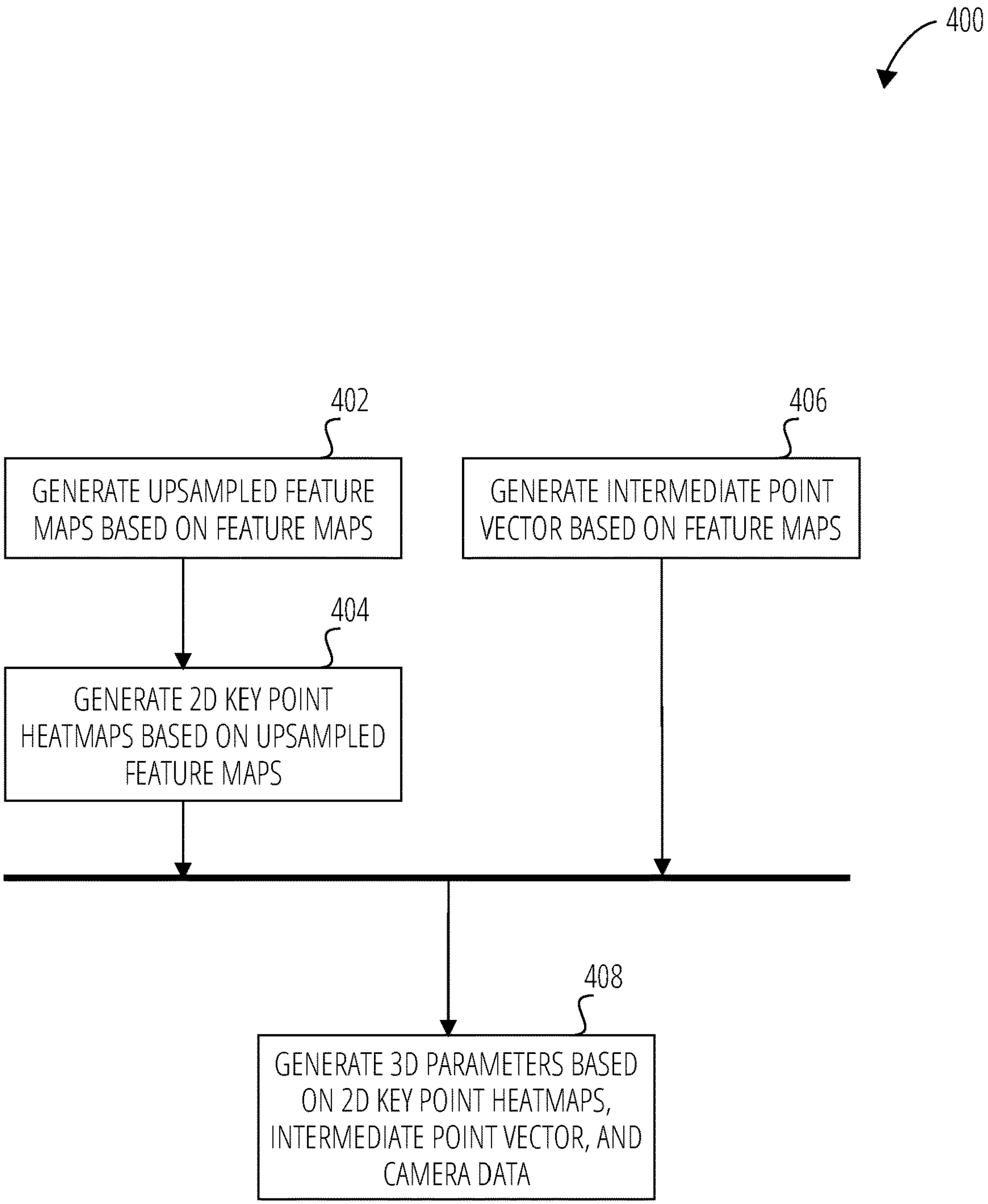
FIG. 4A is another activity diagram of a 3D parameter generation method according to some examples.

236 based on the feature maps 216 and the camera data 226 as more fully described in reference to FIG. 3A and FIG. 4A.

The next frame crop parameters 236 are used by the feature encoder component 214 to crop video frames of the video frame tracking data 240 prior to feature data extraction by the feature encoder component 214. The wrist 3D parameters 228 comprise 3D key point data of 3D key points that comprise a 3D model of portions of the user's forearm, wrist, and hand. The wrist 3D parameters 228 describe a 3D model in a 3D coordinate system of the user's forearm, wrist, and hand. An AR application uses the wrist 3D parameters 228 to create virtual 3D objects that follow the contours and shape of the 3D model of portions of the user's forearm, wrist, and hand. The virtual 3D objects include, but are not limited to, a virtual bracelet, a virtual watch, a virtual ring, and the like. The virtual 3D objects are used by the AR application to create an interactive augmented user interface.

In operation 208, a wrist presence component 218 of the wrist tracking pipeline 238 generates wrist presence score data 248 included in a wrist presence score 230 based on the feature maps 216. An AR application uses the wrist presence score 230 to determine whether a wrist of the user of the computing system is detected by the computing system while the user is interacting with a user interface of the AR application. In some examples, the wrist presence component 218 generates the wrist presence score 230 on a basis of categorizing the feature maps 216 using artificial intelligence methodologies and a wrist presence model previously generated using machine learning methodologies. In some examples, a feature map model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, and the like. In some examples, the wrist presence component 218 uses geometric methodologies to compare one or more geometric relationships between visual features of the user's forearm, wrist, and hand included in the feature maps 216 to previously generated geometric models and generates the wrist presence score data 248 based on the comparison.

In operation 210, a left/right hand classification component 220 of the wrist tracking pipeline 238 generates left/right hand classification score data 252 included in left/right hand classification score 232. The left/right hand classification score 232 is used by an AR application to determine whether a left wrist or a right wrist of the user of the computing system is detected by the computing system while the user is interacting with a user interface of the AR application. In some examples, the left/right hand classification component 220 generates the left/right hand classification score 232 on a basis of categorizing the feature maps 216 using artificial intelligence methodologies and a left/right hand classification model previously generated using machine learning methodologies. In some examples, a left/right hand classification model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, and the like. In some examples, the left/right hand classification component 220 uses geometric methodologies to compare one or more geometric relationships between visual features of the user's forearm, wrist, and hand included in the feature maps 216 to previously generated geometric models and generates data of the left/right hand classification score 232 based on the comparison.

In some examples, additional optional service may be provided by the wrist tracking pipeline 238. In operation 212, a segmentation component 222 generates hand and wrist segmentation data 254 included in hand and wrist segmentation parameters 234. An AR application uses the hand and wrist segmentation parameters 234 to locate augmentations on a wrist of the user of the computing system while the user is interacting with a user interface of the AR application. In some examples, the segmentation component 222 generates the hand and wrist segmentation parameters 234 on a basis of recognizing data of the hand and wrist segmentation parameters 234 based on the feature maps 216 using artificial intelligence methodologies and a hand and wrist segmentation model previously generated using machine learning methodologies. In some examples, a hand and wrist segmentation model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, and the like. In some examples, the segmentation component 222 uses geometric methodologies to compare one or more geometric relationships between visual features of the user's forearm, wrist, and hand included in the feature maps 216 to previously generated geometric models and generates the hand and wrist segmentation data 254 of the hand and wrist segmentation parameters 234 based on the comparison.

In some examples, the 3D parameter component 412, the wrist presence component 218, the left/right hand classification component 220, and/or the segmentation component 222 may exchange data of intermediate or complete results of their respective operations during the wrist tracking method 200.

In some examples, wrist 3D parameters 228 and the wrist presence score 230 includes rotation vector data and translation vector data 260 that are generated for each frame of the camera data 226. The rotation vector data and translation vector data 260 of a previous frame are passed as additional inputs to the feature encoder component 214 for processing for a current frame. This helps the wrist tracking pipeline 238 to more accurately predict the wrist 3D parameters 228, wrist presence score 230, left/right hand classification score 232, and hand and wrist segmentation parameters 234 for the current frame in some cases. During model training, simulated previous frame rotation vector data and translation vector data are generated based on randomly adjusting a current frame's output. In some examples, the simulated previous frame rotation vector data and translation vector data are generated based on the rotation vector data and translation vector data and a probability distribution for previous frame rotation vector data and translation vector data and for some percentage of randomly chosen samples in batch using a uniform distribution. In some examples, the simulated previous frame rotation vector data and translation vector data are generated based on extreme values for the rotation vector data and translation vector data to represent unknown values, such as one or more zero vectors.

Figure 3B:
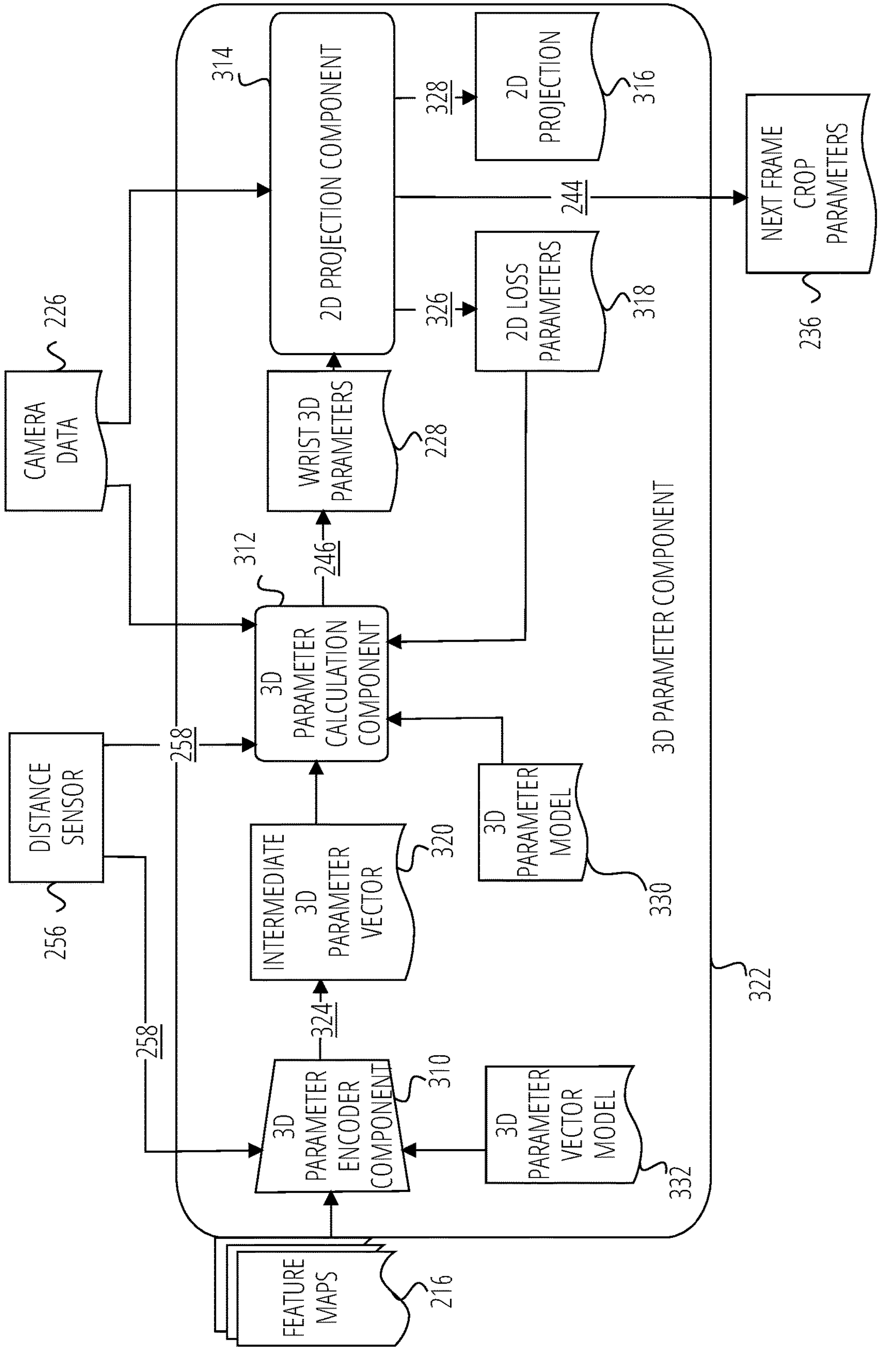
FIG. 3B is a collaboration diagram of a 3D parameter component according to some examples.

FIG. 3A is an activity diagram of a 3D parameter generation method 300, and FIG. 3B is a collaboration diagram of components of a 3D parameter component 322 according to some examples. The 3D parameter generation method 300 is implemented by the 3D parameter component 322 of a wrist tracking pipeline 238 of a computing system. The 3D parameter component 322 generates data of wrist 3D parameters 228 during a wrist tracking method 200 implemented by the wrist tracking pipeline 238.

In operation 302, a 3D parameter encoder component 310 generates intermediate 3D parameter vector data 324 based on the data of the feature maps 216. In some examples, the 3D parameter encoder component 310 generates a wrist rotation value, 2D pixel coordinates, and a disparity vector of the user's wrist's center included in the intermediate 3D parameter vector data 324 based on stereoscopic 3D feature map data of the feature maps 216.

In some examples, the 3D parameter encoder component 310 generates a wrist rotation value, 2D pixel coordinates, and a 3D depth value of the user's wrist's center included in the intermediate 3D parameter vector data 324 based on monoscopic 2D feature map data included in the feature maps 216 and distance data 258 received from a distance sensor 256 of the computing system.

In some examples, the 3D parameter encoder component 310 determines estimated 3D depth values based on monoscopic 2D feature map data of the feature maps 216 and an estimate of a physical dimension, such as a diameter, radius, or circumference, of the user's wrist. The 3D parameter encoder component 310 generates a wrist rotation value, 2D pixel coordinates, and a 3D depth value of the user's wrist's center included in the intermediate 3D parameter vector data 324 based on the monoscopic 2D feature map data and the estimated 3D depth values.

In some examples, the 3D parameter encoder component 310 generates intermediate 3D parameter vector data 324 of the intermediate 3D parameter vector 320 on a basis of categorizing feature map data 250 of the feature maps 216 and/or distance data 258 of the distance sensor 256 using artificial intelligence methodologies and a 3D parameter vector model 332 previously generated using machine learning methodologies. In some examples, a 3D parameter vector model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, and the like.

In operation 304, a 3D parameter calculation component 312 generates data of the wrist 3D parameters 228 based on the intermediate 3D parameter vector 320 and camera data 226. For example, the 3D parameter calculation component 312 generates data of the wrist 3D parameters 228 on a basis of categorizing data of the intermediate 3D parameter vector 320 and the camera data 226 using artificial intelligence methodologies and a 3D parameter model 330 previously generated using machine learning methodologies. In some examples, a 3D parameter model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, and the like.

In operation 306, a 2D projection component 314 generates 2D projection data 428 of a 2D projection 316 and next frame crop data 244 of the next frame crop parameters 236 based on the wrist 3D parameters 228 and the camera data 226. For example, the 2D projection component 314 generates the 2D projection data 428 of the 2D projection 316 of the wrist 3D parameters 228 using perspective projection methodologies from a perspective of the one or more cameras 224 used to capture the video frame tracking data 240 onto an image comprised of video frame tracking data 240 of the camera data 226. The image includes portions of the user's forearm, wrist, and hand corresponding to features described in the wrist 3D parameter data 246. The 2D projection component 314 generates the next frame crop parameters 236 based on the 2D projection 316 onto the image to minimize an amount of the video frame tracking data 240 that is processed by the wrist tracking pipeline 238.

In operation 308, the 2D projection component 314 generates 2D loss data 326 included in 2D loss parameters 318 based on a comparison between the 2D projection 316 and an image comprised of video frame tracking data 240 of the camera data 226 to determine errors and/or differences, termed loss, in the wrist 3D parameter data 246 For example, if the wrist 3D parameter data 246 is accurate, then when the 2D projection 316 of the wrist 3D parameter data 246 is compared to an actual image of the user's forearm, wrist, and hand from the perspective of the one or more cameras 224 used to capture the video frame tracking data 240, then there will be no or small differences or loss between the 2D projection 316 and the actual image of the user's forearm, wrist, and hand. However, if the wrist 3D parameter data 246 is inaccurate, there will be large differences between the 2D projection 316 and the actual image of the user's forearm, wrist, and hand.

In some examples, the 3D parameter calculation component 312 receives the 2D loss parameters 318 and generates corrections to the wrist 3d parameter data of the wrist 3D parameters 228 based on the 2D loss parameters 318, thus using the 2D loss parameters 318 as a feedback error correction to a 3D parameter calculation process performed by the 3D parameter calculation component 312. For example, the 2D projection component 314 maps 3D features in the wrist 3D parameters 228 into corresponding 2D features in the coordinate system of the 2D projection 316, thus the wrist 3D parameters 228 and the 2D projection 316 include corresponding features in their respective coordinate systems. The 2D projection component 314 generates the 2D loss parameters 318 based on the corresponding 2D features in the camera data 226 and the 2D projection 316, thus the 2D loss parameters 318 includes a 2D loss for each corresponding 3D feature in the wrist 3D parameters 228. The 3D parameter calculation component 312 applies an inverse transform to the 2D loss of a corresponding 3D feature from the coordinate system of the 2D loss parameters 318 into a coordinate system of the corresponding 3D feature of the wrist 3D parameters 228. In some examples, the 3D parameter calculation component 312 corrects each 3D feature in the wrist 3D parameters 228 based on the transformed 2D loss data for a corresponding 2D feature of the 2D loss parameters 318. In some examples, the 3D parameter calculation component 312 determines corrections to a 3D parameter model 330 being used by the 3D parameter calculation component 312 based on the transformed 2D loss data. <NOTE TO INVENTORS: I TOOK A GUESS ON HOW THIS MIGHT WORK, PLEASE SUPPLY ME WITH A CORRECTED OR ALTERNATE VERSION>

Figure 4B:
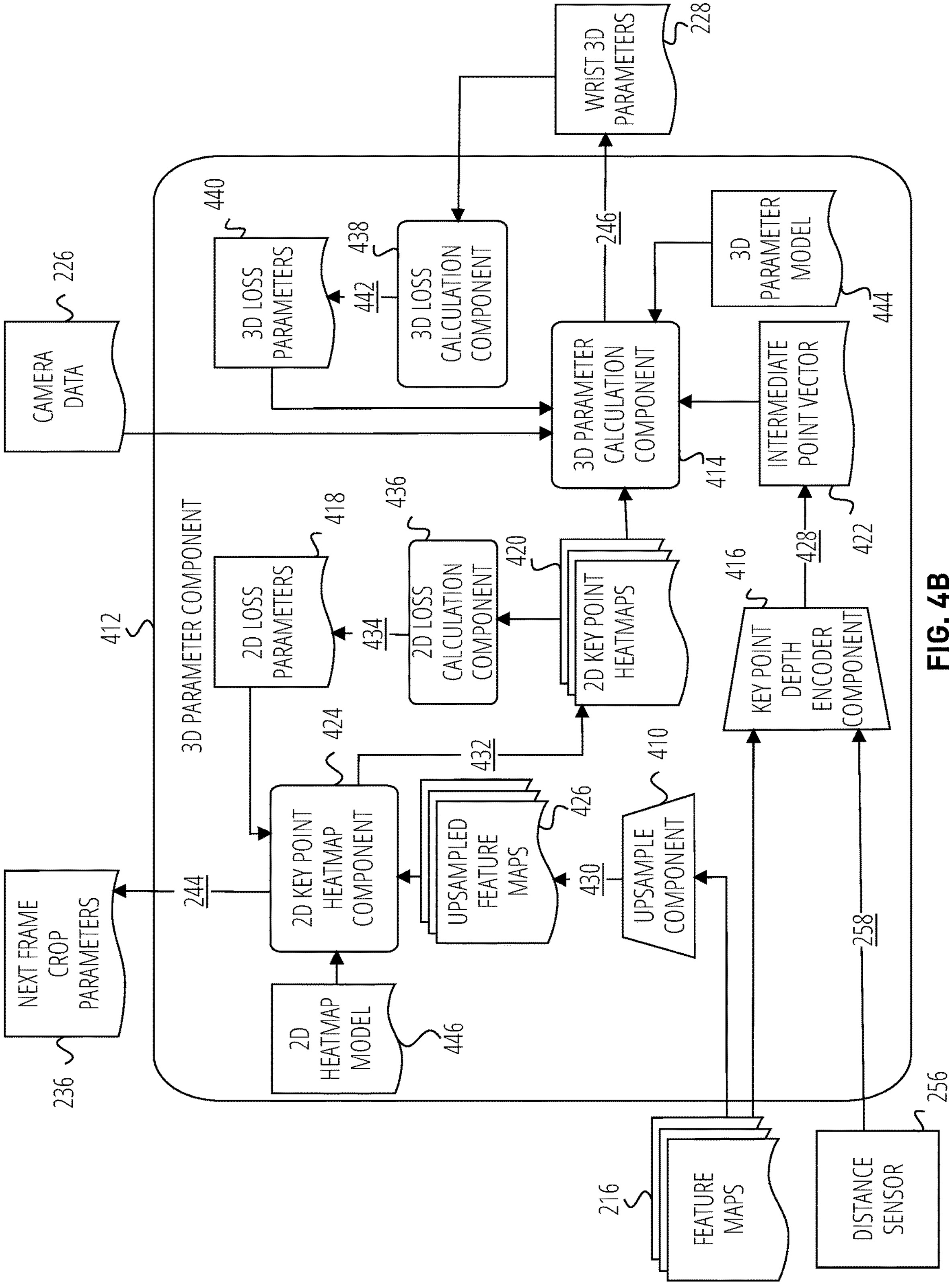
FIG. 4B is another collaboration diagram of a 3D parameter component according to some examples.

FIG. 4A is an activity diagram of another 3D parameter generation method 400 and FIG. 4B is a collaboration diagram of another 3D parameter generation method 400, according to some examples. The 3D parameter generation method 400 is used by a 3D parameter component 412 of a wrist tracking pipeline 238 of a computing system to generate data of wrist 3D parameters 228 during a wrist tracking method 200 implemented by the wrist tracking pipeline 238 of a computing system.

In operation 402, an upsample component 410 generates upsampled feature map data 430 included in one or more upsampled feature maps 426 based on feature maps 216. For example, the upsample component 410 upsamples feature map data in the feature maps 216 by an integer factor by expanding the feature map data using zero padding and then interpolating the expanded feature map data by passing the expanded feature data through a low-pass filter. In an additional example, the upsample component 410 upsamples the feature map data by fractional factor by upsampling the feature map data by a factor L and then decimating the upsampled filter map data by a factor M where L>M.

In operation 404, a 2D key point heatmap component 424 generates 2D key point heatmap data 432 included in one or more 2D key point heatmaps 420 and next frame crop data 244 included in next frame crop parameters 236, based on the upsampled feature maps 426. The 2D key point heatmaps 420 predict 2D pixel coordinates of 3D key points of a 3D model of portions of the user's forearm, wrist, and hand. For example, the 2D key point heatmap component 424 component generates the 2D key point heatmap data 432 using artificial intelligence methodologies and a 2D heatmap model 446 previously generated using machine learning methodologies. In some examples, a 2D heatmap model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, and the like.

In some examples, a 2D loss calculation component 436 calculates 2D loss data 434 included in 2D loss parameters 418 based on the 2D key point heatmaps 420. The 2D key point heatmap component 424 uses the 2D loss parameters 418 to correct the 2D key point heatmap data 432. <Note to inventors: is this a 2D projection method similar to the method described in reference to FIG. 3A and FIG. 3B?>

In operation 406, a key point depth encoder component 416 generates intermediate point vector data 428 included in intermediate point vector 422 based on the feature maps 216. The intermediate point vector 422 includes intermediate depths of 3D key points that are used by a 3D parameter calculation component 414 in combination with camera data 226 to obtain final depths of 3D key points of the wrist 3D parameters 228. In some examples, the key point depth encoder component 416 generates the intermediate point vector data 428 based on stereoscopic 3D feature map data of the feature maps 216.

In some examples, the key point depth encoder component 416 generates the intermediate point vector data 428 based on monoscopic 2D feature map data included in the feature maps 216 and distance data 258 received from a distance sensor 256 of the computing system.

In some examples, the 3D parameter encoder component 310 determines estimated 3D depth values based on monoscopic 2D feature map data of the feature maps 216 and an estimate of a size, such as a diameter, of the user's wrist. The key point depth encoder component 416 generates the intermediate point vector data 428 based on the monoscopic 2D feature map data and the estimated 3D depth values.

In operation 408, the 3D parameter calculation component 414 generates wrist 3D parameter data 246 included in wrist 3D parameters 228 based on the intermediate point vector 422, the 2D key point heatmaps 420 and the camera data 226. For example, the wrist 3D parameters 228 are expressed in a 3D Cartesian coordinate system with an X (horizontal), Y (vertical), and Z (depth) axis and each 3D key point of a 3D model of a user's forearm, wrist, and hand is located in the 3D model with an X, Y, and Z value. The 3D parameter calculation component 414 predicts X and Y values of one or more 3D key points based on the 2D key point heatmaps 420. The 3D parameter calculation component 414 predicts the Z values of the one or more 3D key points based on the X and Y values from the 2D key point heatmaps 420, the intermediate point vector 422, and the camera data 226. To do so, the 3D parameter calculation component 414 projects a UV mapping of a 2D image of the user's forearm, wrist, and hand comprised of video frame tracking data 240 of the camera data 226 onto a 3D model of portions of the user's forearm, wrist, and hand where the one or more 3D key points of the 3D model are comprised of X and Y values from the 2D key point heatmaps 420 and Z values of the 3D key points of the 3D model from the intermediate point vector 422. In some examples, the 3D parameter calculation component 414 generates the wrist 3D parameter data 246 on a basis of categorizing the camera data 226, 2D key point heatmaps 420, and intermediate point vector data 428 using artificial intelligence methodologies and a 3D parameter model 444 previously generated using machine learning methodologies. In some examples, a 3D parameter model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, and the like.

In some examples, a 3D loss calculation component 438 calculates 3D loss data 442 included in 3d loss parameters 440 from the wrist 3D parameters 228. The 3D parameter calculation component 414 generates corrected wrist 3D parameter data 246 included in the wrist 3D parameters 228 based on the 3d loss parameters 440. <Note to inventors: is this similar to the 2D projection method as described in reference to FIG. 3A and FIG. 3B?>

Figure 5:
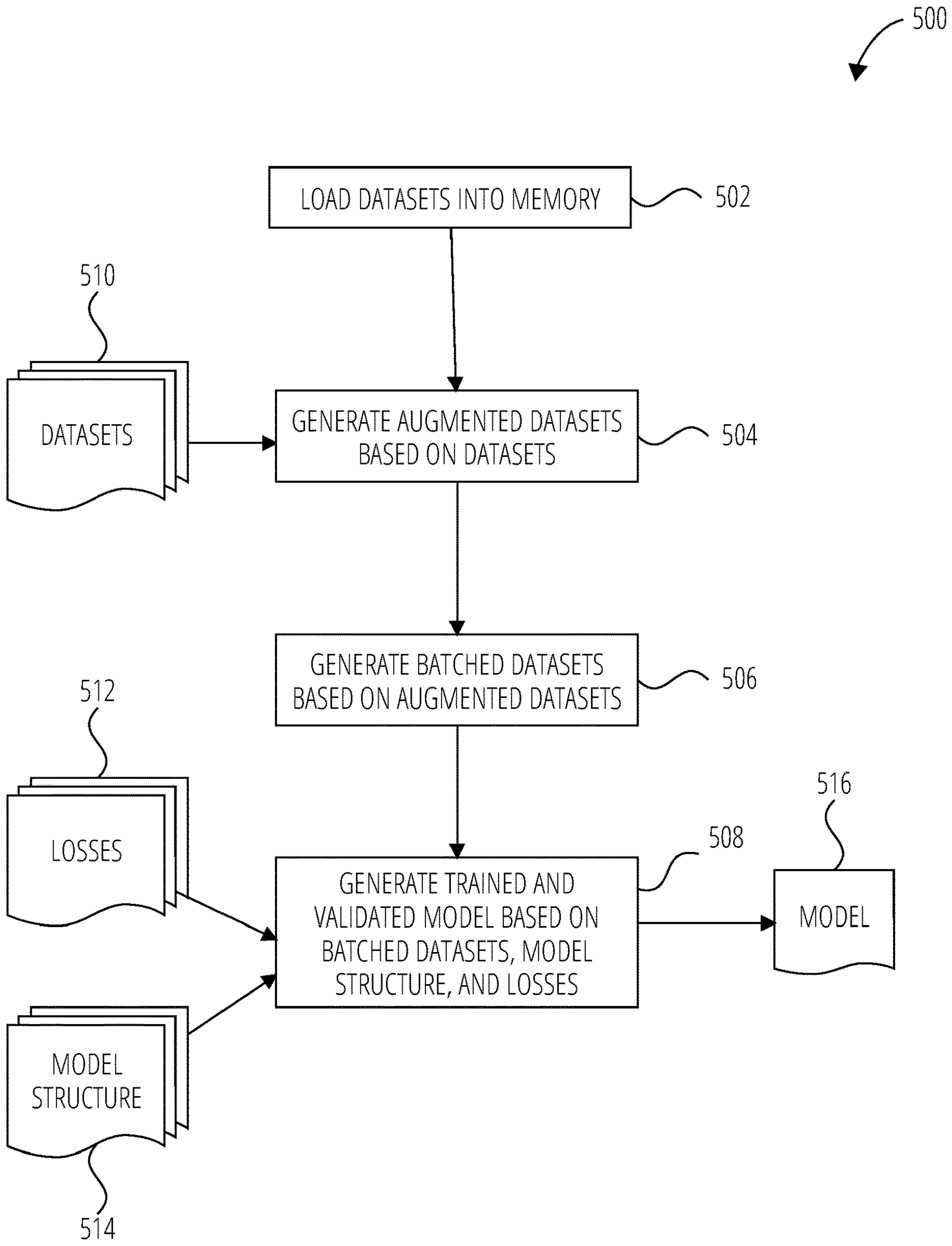
FIG. 5 is an activity diagram of a model generation method according to some examples.

FIG. 5 is an activity diagram of a model generation method 500 according to some examples. A data processing system, such as machine 700, the model generation process is used by a data processing system, such as machine 700, to generate a model 516, such as 3D parameter models 444 and 330, 3D parameter vector model 332, or 2D heatmap model 446 that a 3D parameter component uses to predict various parameters as described herein.

In operation 502, the data processing system loads datasets 510 into memory. In some examples, the datasets 510 include video frame tracking data of users' forearms, wrists, and hands with annotated 3D coordinates of certain wrist key points obtained using "multiview" cameras setups capturing synchronized video frame tracking data from multiple different cameras. The datasets 510 also include annotated 2D coordinates of key points on portions of the captured video frame tracking data and 3D coordinates calculated via triangulation. In some examples, the datasets 510 include annotated 2D coordinates of wrist key points from different types of head-worn devices having video frame tracking data of specific hand poses and the like. In some examples, the video frame tracking data is captured of real-world scenes having visual backgrounds, such as a video screen displaying video images. In some examples, the datasets 510 include video frame tracking data having 2D annotations and 3D annotations. In some examples, the datasets 510 include synthetic video frame tracking data having 3D annotations generated from the synthetic video frame tracking data. The synthetic video frame tracking data is generated by creating a plurality of 3D models of forearms, wrists, and hands posed in various positions and rendering the plurality of 3D models into video frame tracking data simulating a variety of users' forearms, wrists, and hands as if they were captured using physical cameras.

In some examples, the data processing system uses various methodologies to optimize a training process such as, but not limited to, by multitasking, by caching portions of the datasets 510 in memory, and the like.

In operation 504, the data processing system generates augmented datasets based on the datasets 510. For example, the data processing system augments a portion of the video frame tracking data of the datasets 510 using various operations including, but not limited to: rotating a video frame of the video frame tracking data by an arbitrary amount; translating or flipping a video frame across an arbitrary axis such as a vertical axis, a horizontal axis, or partially angled axis; zooming in on a video frame; zooming out on a video frame; combinations of these operations; and the like. The data processing system performs the operations on selected or arbitrary portions of the video frame tracking data and recalculates intrinsic and extrinsic parameters of the portion of the video frame tracking data as appropriate.

In operation 506, the data processing system generates batched datasets based on the augmented datasets. For example, the data processing system batches portions of the datasets 510 by performing various operations on the datasets 510, such as, but not limited to, dataset sample multiplexing with and without replacement and the like. In some examples, the data processing system batches portions of the datasets 510 based on, but not limited to, where the video frame tracking data of the portion of the datasets 510 came from, where in memory or within an external datastore the portion of the datasets 510 are stored, whether the video frame tracking data of the portion of the datasets 510 comprise contrastive or consistency samples, and the like.

In operation 508, the data processing system generates a model 516 based on the batched datasets, a model structure 514, and losses 512 generated by a loss function. In some examples, data processing system uses one or more machine learning methodologies to train the model 516. The model 516 may comprise, but is not limited to, a neural network, a learning vector quantization network, a logistic regression model, a support vector machine, a random decision forest, a naïve Bayes model, a linear discriminant analysis model, a K-nearest neighbor model, and the like. In some examples, the machine learning methodologies may include, but are not limited to, supervised learning, unsupervised learning, semi-supervised learning, reinforcement learning, dimensionality reduction, self-learning, feature learning, sparse dictionary learning, anomaly detection, and the like.

In some examples, the data processing system implements model generation methods for determining a model structure 514, such as, but not limited to, backbone and component configuration, quantized models, and Neural Architecture Search (NAS), and the like.

In some examples, the data processing system implements model generation methods allowing for hyperparameter tuning, quantization-aware training, distillation, user extension and configuration of validation and training metric collection and logging, and the like.

In some examples, the data processing system generates the model 516 using targets with different available annotations by applying 2D and 3D loss functions where applicable. In some examples, the data processing system reduces an impact of inaccuracies of 3D annotations for real images using a robust loss function that doesn't penalize the model 516 when parameters predicted by the model 516 are within a minimum threshold of a target parameter. In some examples, the data processing system mixes synthetic video frame tracking data with actual video frame tracking data and a loss function is applied to the actual video frame tracking data and not the synthetic video frame tracking data. In some examples, a model 516 predicts multiple different outputs that belong to different spaces, have different scales, and are penalized by a loss function differently. In some examples, the data processing system stabilizes multitask training using loss balancing making training the model 516 less sensitive to hyperparameter values. In some examples, the data processing system uses a loss function that includes error handling based on detecting that one or more annotations are missing for some a portion of the video frame tracking data in a batch of the datasets 510.

Figure 6A:
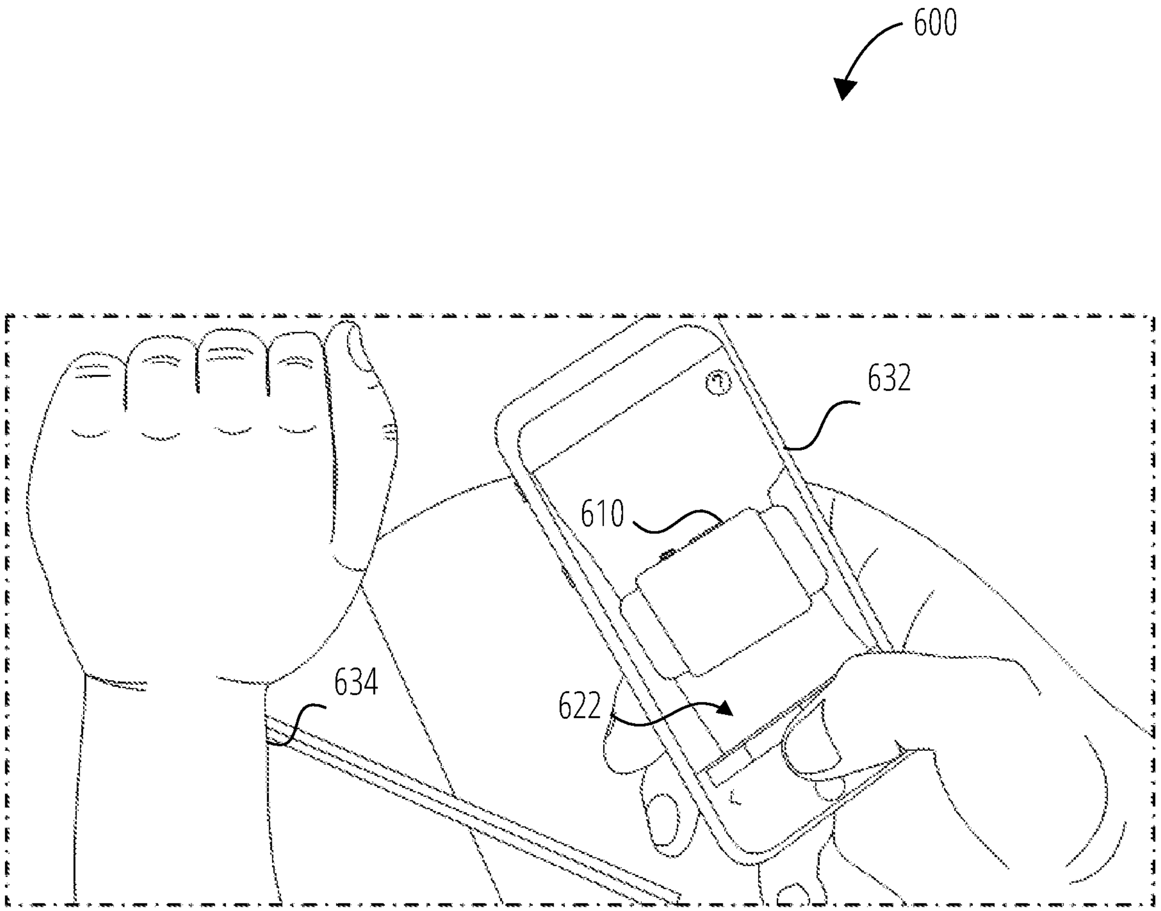
FIG. 6A is an illustration of a user using an AR application of a computing system according to some examples.
Figure 6B:
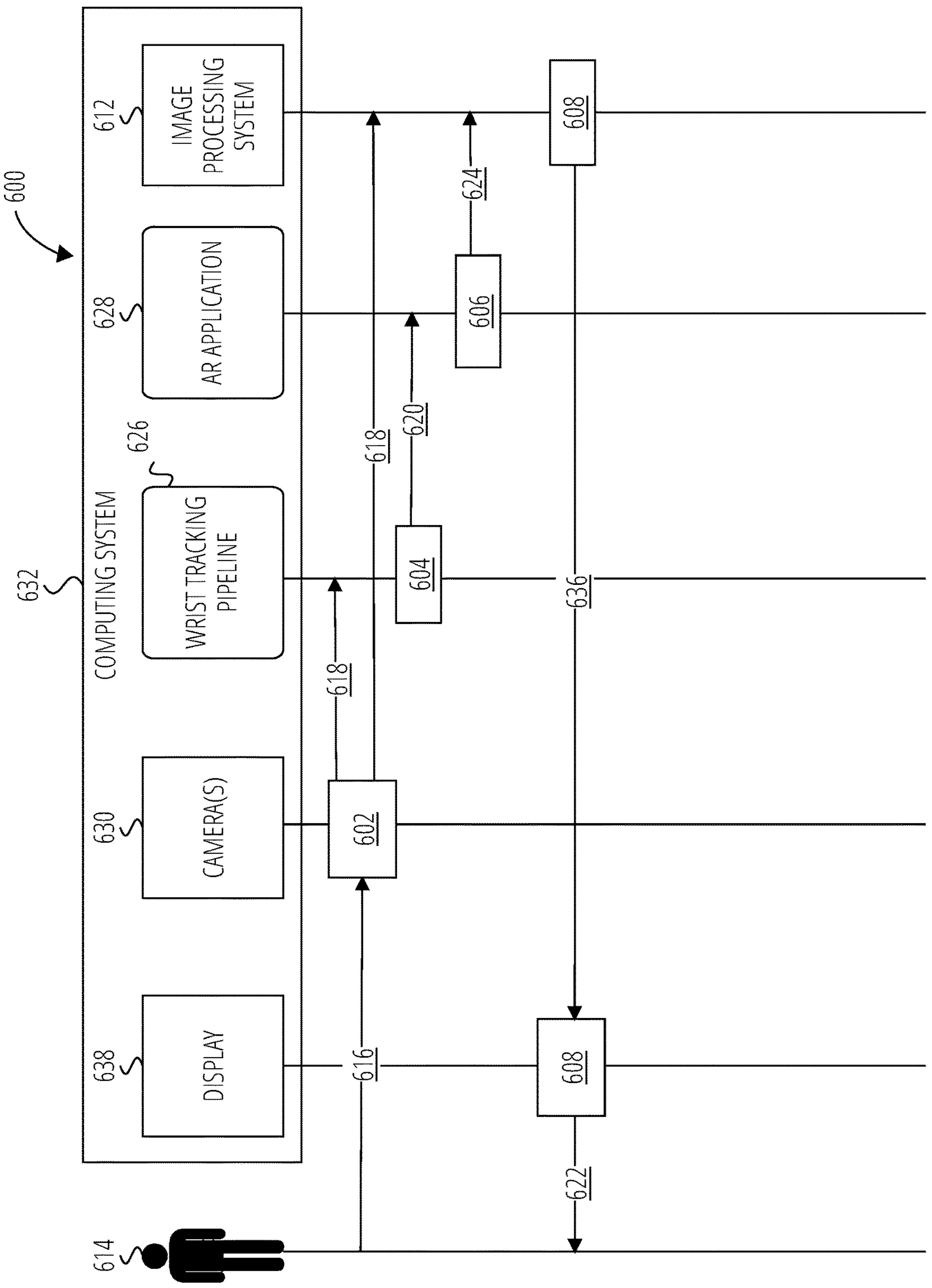
FIG. 6B is a sequence diagram an AR method of an AR application according to some examples.

FIG. 6A is an illustration of a user 614 using an AR application 628 of a computing system 632 and FIG. 6B is a sequence diagram illustrating an AR method 600 of the AR application 628 according to some examples. The computing system 632 uses the AR method 600 to provide an interactive AR user interface 622 of the AR application 628 to the user 614. The AR application 628 provides the interactive AR user interface 622 to the user 614 allowing the user to determine if a physical item represented by virtual item 610 will fit a wrist 634 of the user 614.

In operation 602, AR application 628 uses one or more cameras 630 of the computing system 632 to capture video frame tracking data 618 of portions of the user's forearm, wrist, and hand within a real-world scene 616. The one or more cameras 224 communicate the video frame tracking data 618 to a wrist tracking pipeline 626 and to the AR application 628.

In operation 604, the wrist tracking pipeline 626 receives the video frame tracking data 618. The wrist tracking pipeline 626 generates 3D parameter data 620 based on the video frame tracking data 618 as described herein. The 3D parameter data 620 includes 3D model data of a 3D model of portions of the user's forearm, wrist, and hand. The wrist tracking pipeline 626 communicates the 3D parameter data 620 to the AR application.

In operation 606, the AR application 628 receives the 3D parameter data 620 and generates a virtual item 610 based on the 3D parameter data 620 and 3D model data of a physical item represented by the virtual item 610. The 3D model data of the physical item includes the physical dimensions of the physical item represented by the virtual item 610. The virtual item 610 may comprise, but is not limited to, a virtual bracelet, a virtual watch, a virtual ring, and the like representing the physical item. The AR application 628 generates scaled 3D render data of the virtual item 610 in an orientation and rotation of the wrist of the user 614 such that the virtual item 610 can be displayed as an augmentation to the video frame tracking data 618 in the interactive AR user interface 622. The 3D render data is scaled to match a scale of the portions of the user's forearm, wrist, and hand captured in the video frame tracking data such that the virtual item appears in the same size relationship to the user's forearm, wrist, and hand in the video frame tracking data as the corresponding physical item The AR application generates video frame augmentation data 624 of the interactive AR user interface 622 based on the 3D render data of the virtual item 610. The AR application 628 communicates the video frame augmentation data 624 to an image processing system 612 of the computing system 632.

In operation 608, the image processing system 612 receives the video frame tracking data 618 from the one or more cameras 630 and receives the video frame augmentation data 624 from the AR application 628. The image processing system 612 generates video frame AR user interface data 636 of the interactive AR user interface 622 based on the video frame tracking data 618 and the video frame augmentation data 624. The image processing system 612 provides the interactive AR user interface 622 to the user 614 via a display 638 of the computing system 632 based on the video frame AR user interface data 636.

In some examples, the wrist tracking pipeline 626 continuously repeats the operations of the AR method 600 to provide the interactive AR user interface 622 in real-time to the user 614 as the user 614 rotates and re-orientates their wrist 634 allowing the user 614 to view the virtual item 610 at different rotation angles and orientations that match the rotation angles and orientations of the wrist 634 of the user 614.

In some examples, the AR application 628 uses a wrist presence score generated by the wrist tracking pipeline 626 to determine if a wrist 634 of the user 614 is detectable in the video frame tracking data 618.

In some examples, the AR application uses a left/right hand classification score generated by the wrist tracking pipeline 626 to determine whether the one or more cameras 630 are capturing video frame tracking data of the left wrist or the right wrist of the user 614.

In some examples, the AR application uses hand and wrist segmentation data generated by the wrist tracking pipeline 626 to differentiate different portions or segments of the wrist 634 of the user 614 for placement of a virtual item 610 in an interactive AR user interface 622.

In some examples, the operations of the AR application 628 are distributed across a network. For example, the AR application 628 is a web application connected to a server via a network such as the internet. The AR application 628 communicates the video frame tracking data 618 to the server and the server generates the video frame augmentation data 624 and communicates the video frame augmentation data 624 to the AR application 628 via the network.

In some examples, the AR application 628 composites the video frame tracking data 618 and the video frame augmentation data 624 and communicates the composited video frame data to the image processing system 612. The image processing system 612 receives the composited video frame data and generates the video frame AR user interface data 636 based on the composited video frame data.

Machine Architecture

Figure 7:
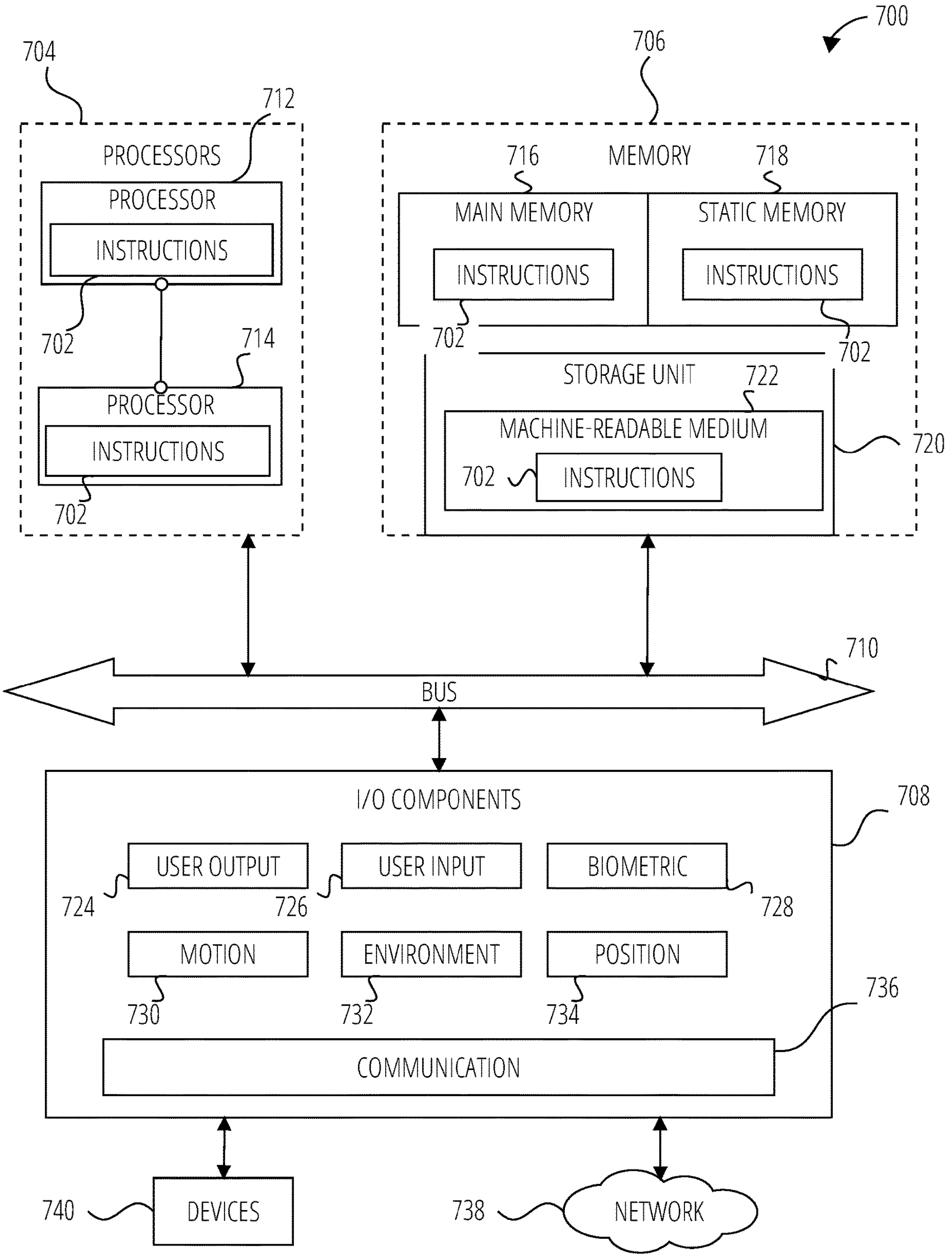
FIG. 7 is a diagrammatic representation of a machine in the form of a computer system within which a set of instructions may be executed to cause the machine to perform any one or more of the methodologies discussed herein, according to some examples.

FIG. 7 is a diagrammatic representation of the machine 700 within which instructions 702 (e.g., software, a program, an application, an applet, an app, or other executable code) for causing the machine 700 to perform any one or more of the methodologies discussed herein may be executed. For example, the instructions 702 may cause the machine 700 to execute any one or more of the methods described herein. The instructions 702 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 702, sequentially or otherwise, that specify actions to be taken by the machine 700. Further, while a single machine 700 is illustrated, the term "machine" shall also be taken to include a collection of machines that individually or jointly execute the instructions 702 to perform any one or more of the methodologies discussed herein. The machine 700, for example, may comprise the computing system 102 or any one of multiple server devices forming part of the interaction server system 110. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 708, which may be configured to communicate with each other via a bus 710. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that execute the instructions 702. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 716, a static memory 718, and a storage unit 720, both accessible to the processors 704 via the bus 710. The main memory 706, the static memory 718, and storage unit 720 store the instructions 702 embodying any one or more of the methodologies or functions described herein. The instructions 702 may also reside, completely or partially, within the main memory 716, within the static memory 718, within machine-readable medium 722 within the storage unit 720, within at least one of the processors 704 (e.g., within the processor's cache memory), or any suitable combination thereof, during execution thereof by the machine 700.

The I/O components 708 may include a wide variety of components to receive input, provide output, produce output, transmit information, exchange information, capture measurements, and so on. The specific I/O components 708 that are included in a particular machine will depend on the type of machine. For example, portable machines such as mobile phones may include a touch input device or other such input mechanisms, while a headless server machine will likely not include such a touch input device. It will be appreciated that the I/O components 708 may include many other components that are not shown in FIG. 7. In various examples, the I/O components 708 may include user output components 724 and user input components 726. The user output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 708 may include biometric components 728, motion components 730, environmental components 732, or position components 734, among a wide array of other components. For example, the biometric components 728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 730 include acceleration sensor components (e.g., accelerometer), gravitation sensor components, rotation sensor components (e.g., gyroscope).

The environmental components 732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that may provide indications, measurements, or signals corresponding to a surrounding physical environment.

With respect to cameras, the computing system 102 may have a camera system comprising, for example, front cameras on a front surface of the computing system 102 and rear cameras on a rear surface of the computing system 102. The front cameras may, for example, be used to capture still images and video of a user of the computing system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the computing system 102 may also include a 360° camera for capturing 360° photographs and videos.

Further, the camera system of the computing system 102 may include dual rear cameras (e.g., a primary camera as well as a depth-sensing camera), or even triple, quad or penta rear camera configurations on the front and rear sides of the computing system 102. These multiple cameras systems may include a wide camera, an ultra-wide camera, a telephoto camera, a macro camera, and a depth sensor, for example.

The position components 734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 708 further include communication components 736 operable to couple the machine 700 to a network 738 or devices 740 via respective coupling or connections. For example, the communication components 736 may include a network interface component or another suitable device to interface with the network 738. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 740 may be another machine or any of a wide variety of peripheral devices (e.g., a peripheral device coupled via a USB).

Moreover, the communication components 736 may detect identifiers or include components operable to detect identifiers. For example, the communication components 736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

The various memories (e.g., main memory 716, static memory 718, and memory of the processors 704) and storage unit 720 may store one or more sets of instructions and data structures (e.g., software) embodying or used by any one or more of the methodologies or functions described herein. These instructions (e.g., the instructions 702), when executed by processors 704, cause various operations to implement the disclosed examples.

The instructions 702 may be transmitted or received over the network 738, using a transmission medium, via a network interface device (e.g., a network interface component included in the communication components 736) and using any one of several well-known transfer protocols (e.g., hypertext transfer protocol (HTTP)). Similarly, the instructions 702 may be transmitted or received using a transmission medium via a coupling (e.g., a peer-to-peer coupling) to the devices 740.

System with Head-Wearable Apparatus

Figure 8:
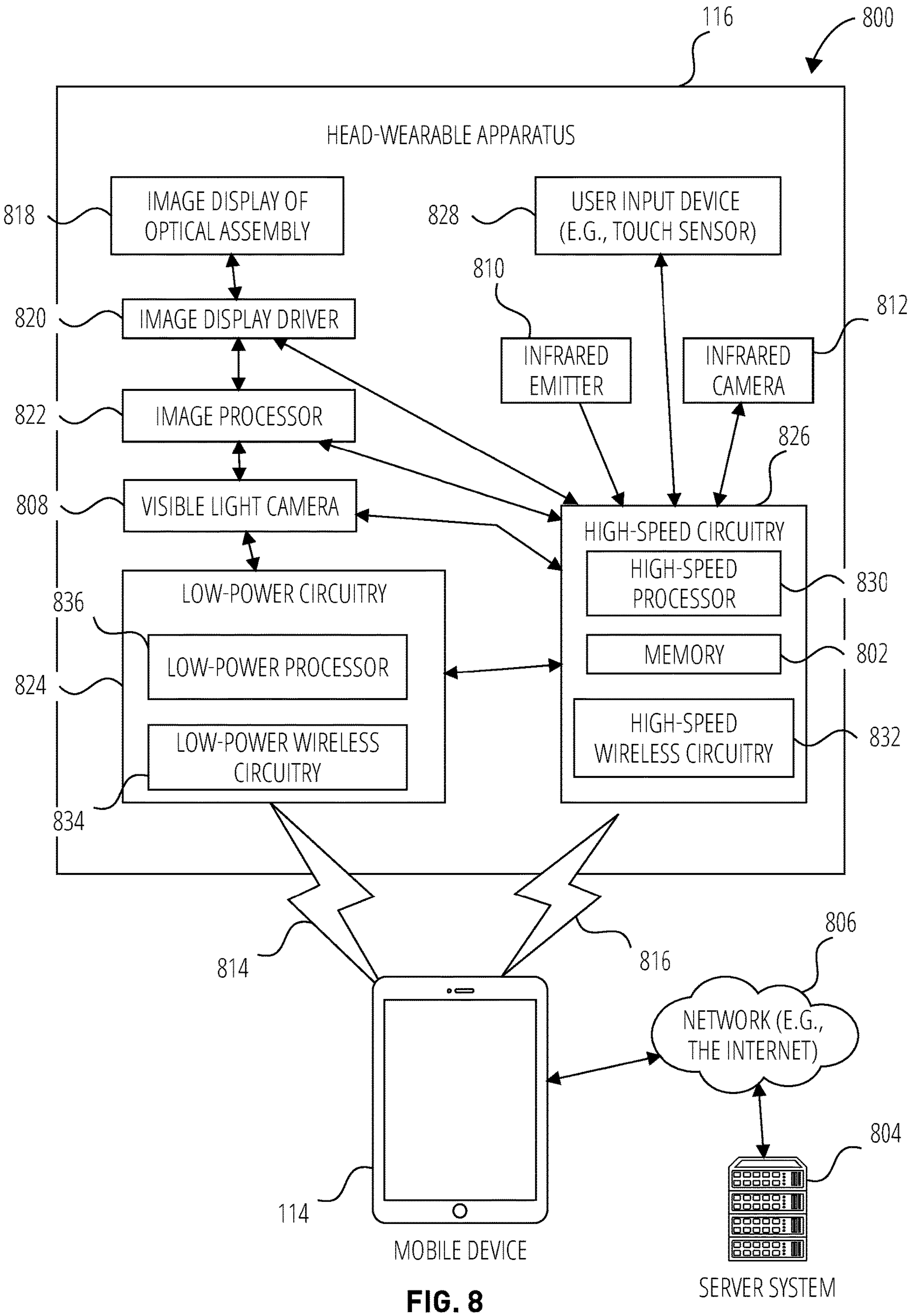
FIG. 8 illustrates a system of a head-wearable apparatus, according to some examples.

FIG. 8 illustrates a system 800 including a head-wearable apparatus 116 with a selector input device, according to some examples. FIG. 8 is a high-level functional block diagram of an example head-wearable apparatus 116 communicatively coupled to a mobile device 114 and various server systems 804 (e.g., the interaction server system 110) via various networks 108.

The head-wearable apparatus 116 includes one or more cameras, each of which may be, for example, a visible light camera 808, an infrared emitter 810, and an infrared camera 812.

The mobile device 114 connects with head-wearable apparatus 116 using both a low-power wireless connection 814 and a high-speed wireless connection 816. The mobile device 114 is also connected to the server system 804 and the network 806.

The head-wearable apparatus 116 further includes two image displays of the image display of optical assembly 818. The two image displays of optical assembly 818 include one associated with the left lateral side and one associated with the right lateral side of the head-wearable apparatus 116. The head-wearable apparatus 116 also includes an image display driver 820, an image processor 822, low-power circuitry 824, and high-speed circuitry 826. The image display of optical assembly 818 is for presenting images and videos, including an image that can include a graphical user interface to a user of the head-wearable apparatus 116.

The image display driver 820 commands and controls the image display of optical assembly 818. The image display driver 820 may deliver image data directly to the image display of optical assembly 818 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 828 (e.g., touch sensor or push button), including an input surface on the head-wearable apparatus 116. The user input device 828 (e.g., touch sensor or push button) is to receive from the user an input selection to manipulate the graphical user interface of the presented image.

The components shown in FIG. 8 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 808 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 802, which stores instructions to perform a subset or all of the functions described herein. The memory 802 can also include storage device.

As shown in FIG. 8, the high-speed circuitry 826 includes a high-speed processor 830, a memory 802, and high-speed wireless circuitry 832. In some examples, the image display driver 820 is coupled to the high-speed circuitry 826 and operated by the high-speed processor 830 in order to drive the left and right image displays of the image display of optical assembly 818. The high-speed processor 830 may be any processor capable of managing high-speed communications and operation of any general computing system needed for the head-wearable apparatus 116. The high-speed processor 830 includes processing resources needed for managing high-speed data transfers on a high-speed wireless connection 816 to a wireless local area network (WLAN) using the high-speed wireless circuitry 832. In certain examples, the high-speed processor 830 executes an operating system such as a LINUX operating system or other such operating system of the head-wearable apparatus 116, and the operating system is stored in the memory 802 for execution. In addition to any other responsibilities, the high-speed processor 830 executing a software architecture for the head-wearable apparatus 116 is used to manage data transfers with high-speed wireless circuitry 832. In certain examples, the high-speed wireless circuitry 832 is configured to implement Institute of Electrical and Electronic Engineers (IEEE) 802.11 communication standards, also referred to herein as WiFi. In some examples, other high-speed communications standards may be implemented by the high-speed wireless circuitry 832.

The low-power wireless circuitry 834 and the high-speed wireless circuitry 832 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 814 and the high-speed wireless connection 816, may be implemented using details of the architecture of the head-wearable apparatus 116, as can other elements of the network 806.

The memory 802 includes any storage device capable of storing various data and applications, including, among other things, camera data generated by the left and right visible light cameras 808, the infrared camera 812, and the image processor 822, as well as images generated for display by the image display driver 820 on the image displays of the image display of optical assembly 818. While the memory 802 is shown as integrated with high-speed circuitry 826, in some examples, the memory 802 may be an independent standalone element of the head-wearable apparatus 116. In certain such examples, electrical routing lines may provide a connection through a chip that includes the high-speed processor 830 from the image processor 822 or the low-power processor 836 to the memory 802. In some examples, the high-speed processor 830 may manage addressing of the memory 802 such that the low-power processor 836 will boot the high-speed processor 830 any time that a read or write operation involving memory 802 is needed.

As shown in FIG. 8, the low-power processor 836 or high-speed processor 830 of the head-wearable apparatus 116 can be coupled to the camera (visible light camera 808, infrared emitter 810, or infrared camera 812), the image display driver 820, the user input device 828 (e.g., touch sensor or push button), and the memory 802.

The head-wearable apparatus 116 is connected to a host computer. For example, the head-wearable apparatus 116 is paired with the mobile device 114 via the high-speed wireless connection 816 or connected to the server system 804 via the network 806. The server system 804 may be one or more computing devices as part of a service or network computing system, for example, that includes a processor, a memory, and network communication interface to communicate over the network 806 with the mobile device 114 and the head-wearable apparatus 116.

The mobile device 114 includes a processor and a network communication interface coupled to the processor. The network communication interface allows for communication over the network 806, low-power wireless connection 814, or high-speed wireless connection 816. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 820. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 804, such as the user input device 828, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 814 and high-speed wireless connection 816 from the mobile device 114 via the low-power wireless circuitry 834 or high-speed wireless circuitry 832.

Data Architecture

Figure 9:
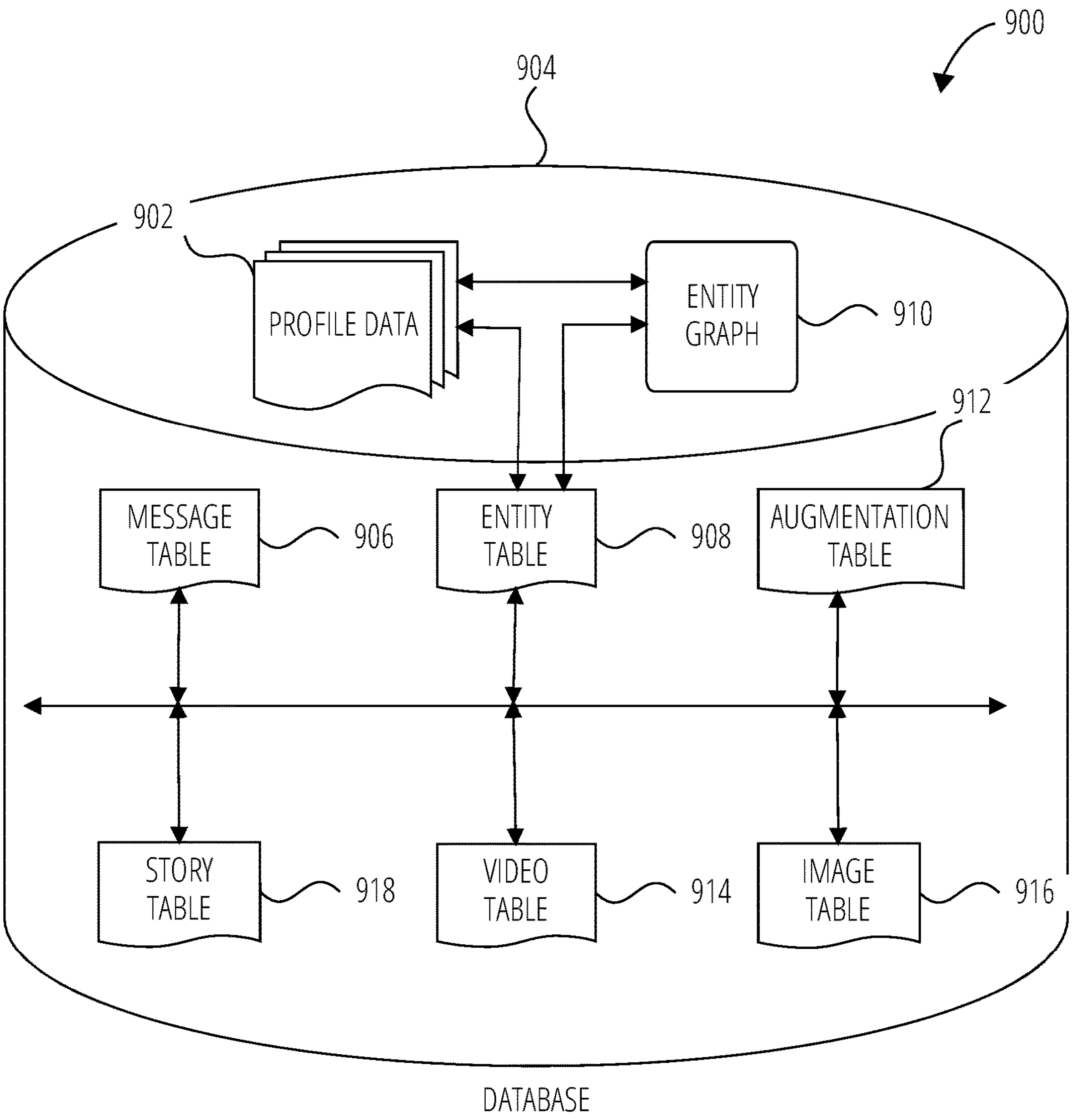
FIG. 9 is a diagrammatic representation of a data structure as maintained in a database, according to some examples.

FIG. 9 is a schematic diagram illustrating data structures 900, which may be stored in the database 904 of the interaction server system 110, according to certain examples. While the content of the database 904 is shown to comprise multiple tables, it will be appreciated that the data could be stored in other types of data structures (e.g., as an object-oriented database).

The database 904 includes message data stored within a message table 906. This message data includes, for any particular message, at least message sender data, message recipient (or receiver) data, and a payload. Further details regarding information that may be included in a message, and included within the message data stored in the message table 906, are described below with reference to FIG. 9.

An entity table 908 stores entity data, and is linked (e.g., referentially) to an entity graph 910 and profile data 902. Entities for which records are maintained within the entity table 908 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 910 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 908. Such privacy settings may be applied to all types of relationships within the context of the interaction system 100, or may selectively be applied to only certain types of relationships.

The profile data 902 stores multiple types of profile data about a particular entity. The profile data 902 may be selectively used and presented to other users of the interaction system 100 based on privacy settings specified by a particular entity. Where the entity is an individual, the profile data 902 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 902 for the group may similarly include one or more avatar representations associated with the group, in addition to the group name, members, and various settings (e.g., notifications) for the relevant group.

The database 904 also stores augmentation data, such as overlays or filters, in an augmentation table 912. The augmentation data is associated with and applied to videos (for which data is stored in a video table 914) and images (for which data is stored in an image table 916).

Filters, in some examples, are overlays that are displayed as overlaid on an image or video during presentation to a message receiver. Filters may be of various types, including user-selected filters from a set of filters presented to a message sender by the interaction client 104 when the message sender is composing a message. Other types of filters include geolocation filters (also known as geo-filters), which may be presented to a message sender based on geographic location. For example, geolocation filters specific to a neighborhood or special location may be presented within a user interface by the interaction client 104, based on geolocation information determined by a Global Positioning System (GPS) unit of the computing system 102.

Another type of filter is a data filter, which may be selectively presented to a message sender by the interaction client 104 based on other inputs or information gathered by the computing system 102 during the message creation process. Examples of data filters include current temperature at a specific location, a current speed at which a message sender is traveling, battery life for a computing system 102, or the current time.

Other augmentation data that may be stored within the image table 916 includes augmented reality content items (e.g., corresponding to applying Lenses or augmented reality experiences). An augmented reality content item may be a real-time special effect and sound that may be added to an image or a video.

As described above, augmentation data includes augmented reality (AR), virtual reality (VR) and mixed reality (MR) content items, overlays, image transformations, images, and modifications that may be applied to image data (e.g., videos or images). This includes real-time modifications, which modify an image as it is captured using device sensors (e.g., one or multiple cameras) of the computing system 102 and then displayed on a screen of the computing system 102 with the modifications. This also includes modifications to stored content, such as video clips in a collection or group that may be modified. For example, in a computing system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a computing system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, visual features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the computing system 102) and perform complex image manipulations locally on the computing system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the computing system 102.

In some examples, a computer animation model to transform image data can be used by a system where a user may capture an image or video stream of the user (e.g., a selfie) using the computing system 102 having a neural network operating as part of an interaction client 104 operating on the computing system 102. The transformation system operating within the interaction client 104 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the computing system 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 918 stores data regarding collections of messages and associated image, video, or audio data, which are compiled into a collection (e.g., a story or a gallery). The creation of a particular collection may be initiated by a particular user (e.g., each user for which a record is maintained in the entity table 908). A user may create a "personal story" in the form of a collection of content that has been created and sent/broadcast by that user. To this end, the user interface of the interaction client 104 may include an icon that is user-selectable to enable a message sender to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose computing system 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 914 stores video data that, in some examples, is associated with messages for which records are maintained within the message table 906. Similarly, the image table 916 stores image data associated with messages for which message data is stored in the entity table 908. The entity table 908 may associate various augmentations from the augmentation table 912 with various images and videos stored in the image table 916 and the video table 914.

The databases 904 also includes social network information collected by the social network system 1022.

System Architecture

Figure 10:
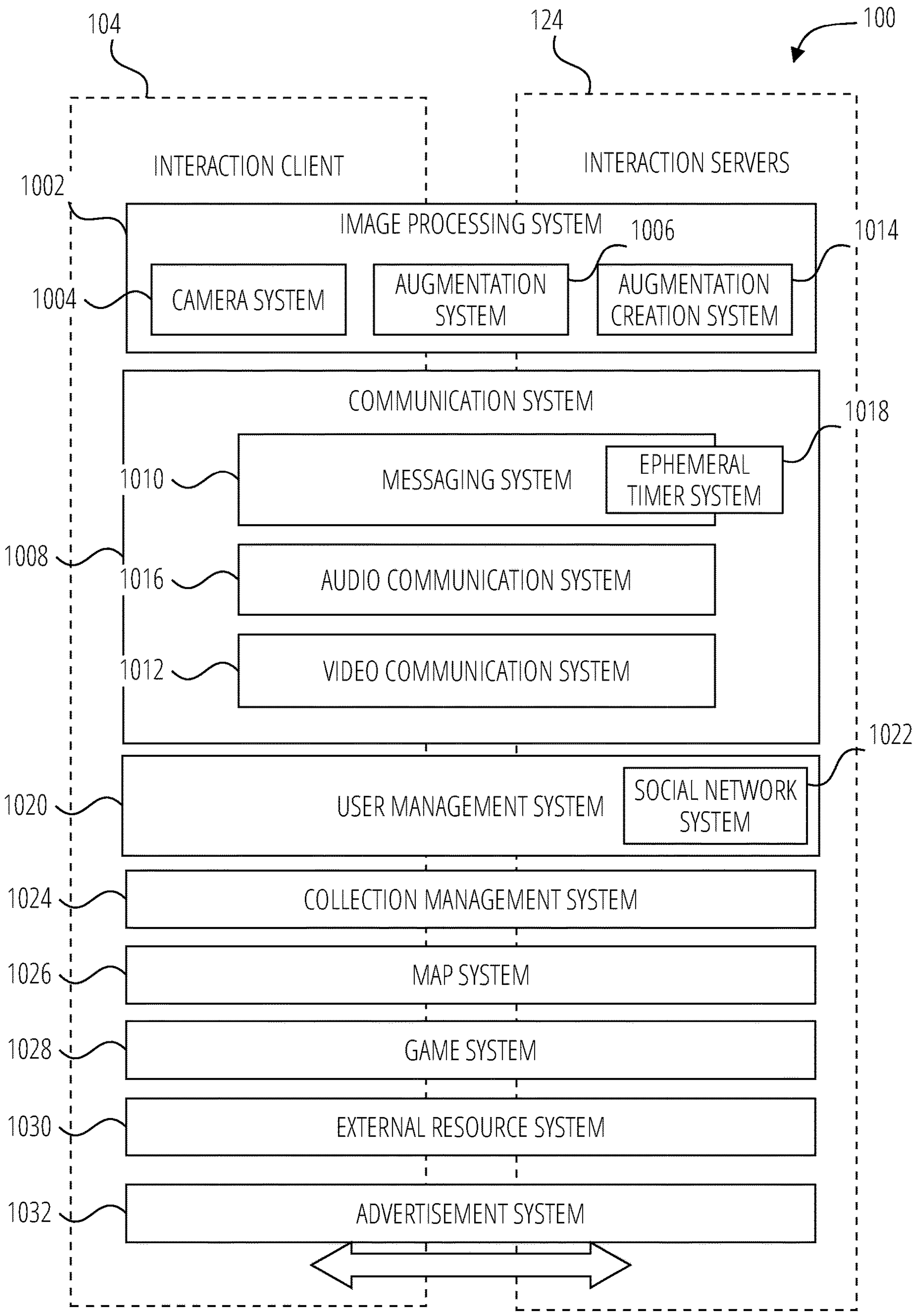
FIG. 10 is a diagrammatic representation of a messaging system, according to some examples, that has both client-side and server-side functionality.

FIG. 10 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 1002 provides various functions that enable a user to capture and augment (e.g., augment or otherwise modify or edit) media content associated with a message.

A camera system 1004 includes control software (e.g., in a camera application) that interacts with and controls hardware camera hardware (e.g., directly or via operating system controls) of the computing system 102 to modify and augment real-time images captured and displayed via the interaction client 104.

The augmentation system 1006 provides functions related to the generation and publishing of augmentations (e.g., media overlays) for images captured in real-time by cameras of the computing system 102 or retrieved from memory of the computing system 102. For example, the augmentation system 1006 operatively selects, presents, and displays media overlays (e.g., an image filter or an image lens) to the interaction client 104 for the augmentation of real-time images received via the camera system 1004 or stored images retrieved from memory 802 of a computing system 102. These augmentations are selected by the augmentation system 1006 and presented to a user of an interaction client 104, based on a number of inputs and data, such as for example:

- Geolocation of the computing system 102; and
- Social network information of the user of the computing system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at computing system 102 for communication in a message, or applied to video content, such as a video content stream or feed transmitted from an interaction client 104. As such, the image processing system 1002 may interact with, and support, the various subsystems of the communication system 1008, such as the messaging system 1010 and the video communication system 1012.

A media overlay may include text or image data that can be overlaid on top of a photograph taken by the computing system 102 or a video stream produced by the computing system 102. In some examples, the media overlay may be a location overlay (e.g., Venice beach), a name of a live event, or a name of a merchant overlay (e.g., Beach Coffee House). In further examples, the image processing system 1002 uses the geolocation of the computing system 102 to identify a media overlay that includes the name of a merchant at the geolocation of the computing system 102. The media overlay may include other indicia associated with the merchant. The media overlays may be stored in the databases 128 and accessed through the database server 126.

The image processing system 1002 provides a user-based publication platform that enables users to select a geolocation on a map and upload content associated with the selected geolocation. The user may also specify circumstances under which a particular media overlay should be offered to other users. The image processing system 1002 generates a media overlay that includes the uploaded content and associates the uploaded content with the selected geolocation.

The augmentation creation system 1014 supports augmented reality developer platforms and includes an application for content creators (e.g., artists and developers) to create and publish augmentations (e.g., augmented reality experiences) of the interaction client 104. The augmentation creation system 1014 provides a library of built-in features and tools to content creators including, for example custom shaders, tracking technology, and templates.

In some examples, the augmentation creation system 1014 provides a merchant-based publication platform that enables merchants to select a particular augmentation associated with a geolocation via a bidding process. For example, the augmentation creation system 1014 associates a media overlay of the highest bidding merchant with a corresponding geolocation for a predefined amount of time.

A communication system 1008 is responsible for enabling and processing multiple forms of communication and interaction within the interaction system 100 and includes a messaging system 1010, an audio communication system 1016, and a video communication system 1012. The messaging system 1010 is responsible for enforcing the temporary or time-limited access to content by the interaction clients 104. The messaging system 1010 incorporates multiple timers (e.g., within an ephemeral timer system 1018) that, based on duration and display parameters associated with a message or collection of messages (e.g., a story), selectively enable access (e.g., for presentation and display) to messages and associated content via the interaction client 104. Further details regarding the operation of the ephemeral timer system 1018 are provided below. The audio communication system 1016 enables and supports audio communications (e.g., real-time audio chat) between multiple interaction clients 104. Similarly, the video communication system 1012 enables and supports video communications (e.g., real-time video chat) between multiple interaction clients 104.

A user management system 1020 is operationally responsible for the management of user data and profiles, and includes a social network system 1022 that maintains social network information regarding relationships between users of the interaction system 100.

A collection management system 1024 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 1024 may also be responsible for publishing an icon that provides notification of a particular collection to the user interface of the interaction client 104. The collection management system 1024 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 1024 employs machine vision (or image recognition technology) and content rules to curate a content collection automatically. In certain examples, compensation may be paid to a user to include user-generated content into a collection. In such cases, the collection management system 1024 operates to automatically make payments to such users to use their content.

A map system 1026 provides various geographic location functions and supports the presentation of map-based media content and messages by the interaction client 104. For example, the map system 1026 enables the display of user icons or avatars (e.g., stored in profile data 902) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 1028 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 1030 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a computing system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 1032 operationally enables the purchasing of advertisements by third parties for presentation to end-users via the interaction clients 104 and also handles the delivery and presentation of these advertisements.

Software Architecture

Figure 11:
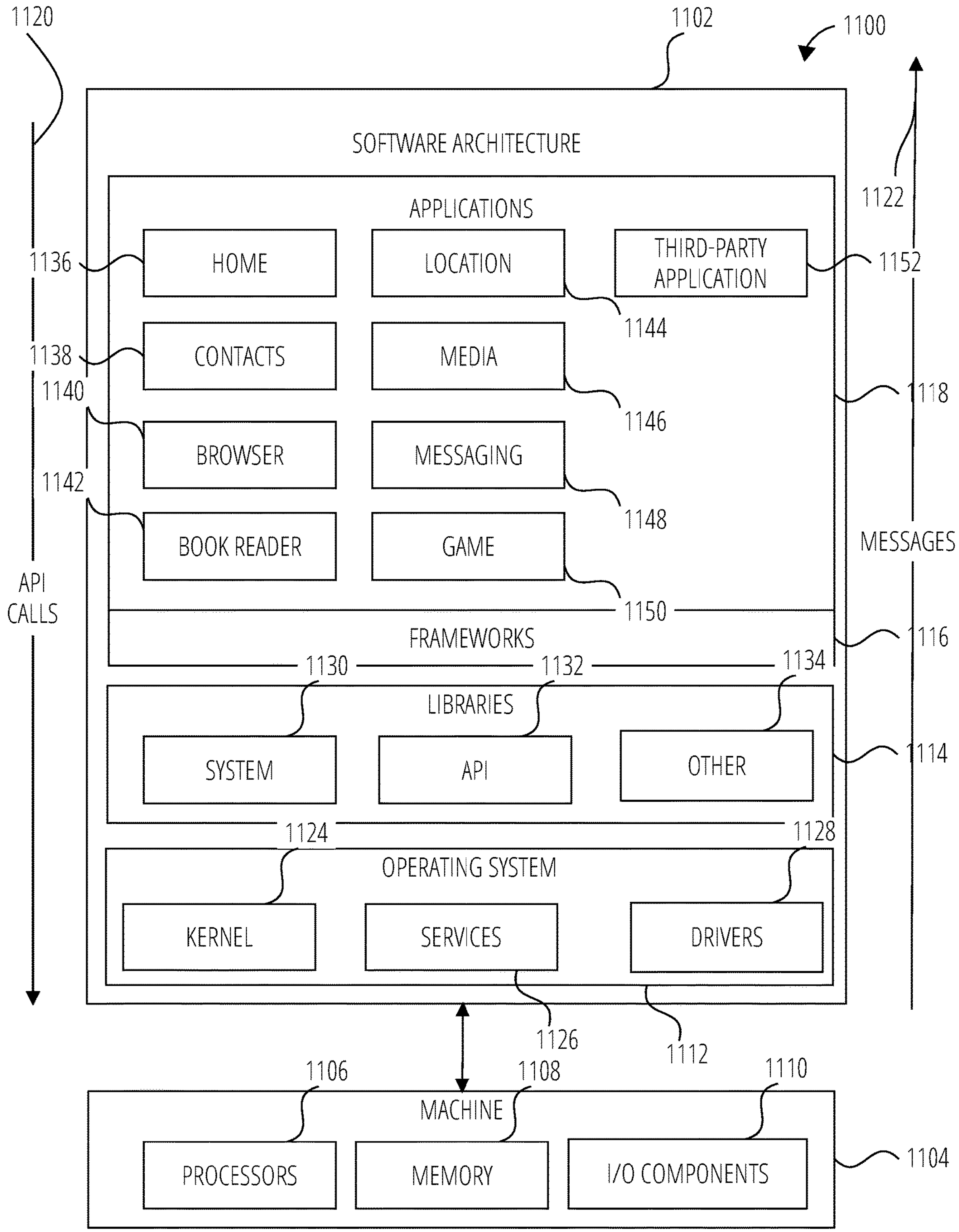
FIG. 11 is a block diagram showing a software architecture within which examples may be implemented.
Figure 12:
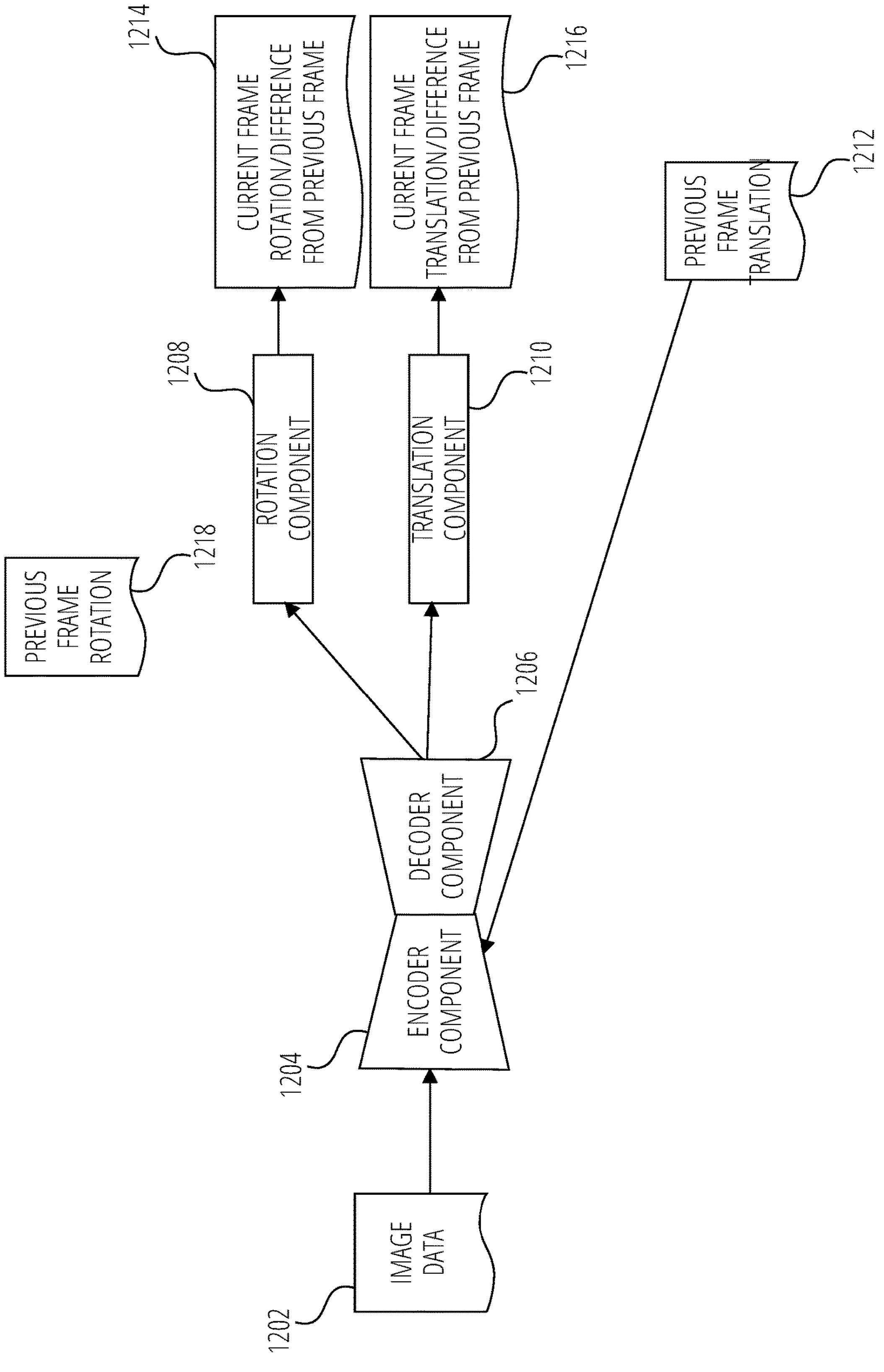
FIG. 12 illustrates an aspect of the subject matter in accordance with one embodiment.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

CONCLUSION

Changes and modifications may be made to the disclosed examples without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computing system comprising:
- one or more processors;
- one or more cameras; and
- a memory storing instructions that, when executed by the one or more processors, cause the computing system to perform operations comprising:
- capturing, using the one or more cameras, video frame tracking data of a wrist of a user;
- generating 3D parameter data describing a 3D model of the wrist of the user based on the video frame tracking data;
- correcting the 3D parameter data of the wrist of the user based on 2D loss data generated using a 2D projection of the 3D parameter data describing the 3D model of the wrist of the user onto an image of the wrist of the user;
- generating 3D render data of a virtual item based on the 3D parameter data of the wrist of the user and 3D model data of a physical item represented by the virtual item;
- generating Augmented Reality (AR) user interface video frame data based on the 3D render data and the video frame tracking data; and
- providing an AR user interface based on the AR user interface video frame data.

2. The computing system of claim 1, wherein the computing system further comprises a distance sensor, and wherein generating the 3D parameter data further comprises:
- capturing, using one or more distance sensors of the computing system, distance data of the wrist of the user; and
- generating the 3D parameter data based on the video frame tracking data and the distance data.

3. The computing system of claim 1, wherein generating the 3D parameter data further comprises:
- generating feature map data including 3D coordinate data of visual features of the wrist of the user based on the video frame tracking data; and
- generating intermediate 3D parameter vector data based on the feature map data.

4. The computing system of claim 1, wherein generating the 3D parameter data further comprises:
- capturing, using one or more distance sensors of the computing system, distance data of the wrist of the user;
- generating feature map data including 2D coordinate data of visual features of the wrist of the user based on the video frame tracking data; and
- generating intermediate 3D parameter vector data based on the feature map data and the distance data.

5. The computing system of claim 1, wherein generating the 3D parameter data further comprises:
- generating the 3D parameter data of the wrist of the user based on the video frame tracking data and a 3D parameter model generated using a combination of synthetic video frame tracking data and actual video frame tracking data.

6. The computing system of claim 5, wherein a loss function used during the generation of the 3D parameter model is applied to the actual video frame tracking data and not to the synthetic video frame tracking data.

7. A computer-implemented method comprising:
capturing, using one or more cameras of a computing system, video frame tracking data of a wrist of a user;
generating, by one or more processors, 3D parameter data describing a 3D model of the wrist of the user based on the video frame tracking data;
correcting, by the one or more processors, the 3D parameter data of the wrist of the user based on 2D loss data generated using a 2D projection of the 3D parameter data describing the 3D model of the wrist of the user onto an image of the wrist of the user;
generating, by the one or more processors, 3D render data of a virtual item based on the 3D parameter data of the wrist of the user and 3D model data of a physical item represented by the virtual item;
generating, by the one or more processors, AR user interface video frame data based on the 3D render data and the video frame tracking data; and
providing, by the one or more processors, using a display of a computing system, an AR user interface to the user based on the video frame AR user interface video frame data.

8. The computer-implemented method of claim 7, wherein generating the 3D parameter data further comprises:
capturing, using one or more distance sensors of the computing system, distance data of the wrist of the user; and
generating the 3D parameter data based on the video frame tracking data and the distance data.

9. The computer-implemented method of claim 7, wherein generating the 3D parameter data further comprises:
generating feature map data including 3D coordinate data of visual features of the wrist of the user based on the video frame tracking data; and
generating intermediate 3D parameter vector data based on the feature map data.

10. The computer-implemented method of claim 7, wherein generating the 3D parameter data further comprises:
capturing, using one or more distance sensors of the computing system, distance data of the wrist of the user;
generating feature map data including 2D coordinate data of visual features of the wrist of the user based on the video frame tracking data; and
generating intermediate 3D parameter vector data based on the feature map data and the distance data.

11. The computer-implemented method of claim 7, wherein generating the 3D parameter data further comprises:
generating the 3D parameter data of the wrist of the user based on the video frame tracking data and a 3D parameter model generated using a combination of synthetic video frame tracking data and actual video frame tracking data.

12. The computer-implemented method of claim 11, wherein a loss function used during the generation of the 3D parameter model is applied to the actual video frame tracking data and not to the synthetic video frame tracking data.

13. A non-transitory computer-readable storage medium, the computer-readable storage medium including instructions that when executed by a computer, cause the computer to perform operations comprising:
capturing, using one or more cameras, video frame tracking data of a wrist of a user;
generating 3D parameter data describing a 3D model of the wrist of the user based on the video frame tracking data;
correcting the 3D parameter data of the wrist of the user based on 2D loss data generated using a 2D projection of the 3D parameter data describing the 3D model of the wrist of the user onto an image of the wrist of the user;
generating 3D render data of a virtual item based on the 3D parameter data of the wrist of the user and 3D model data of a physical item represented by the virtual item;
generating AR user interface video frame data based on the 3D render data and the video frame tracking data; and
providing, using a display of a computing system, an AR user interface to the user based on the AR user interface video frame data.

14. The computer-readable storage medium of claim 13, wherein generating the 3D parameter data further comprises:
capturing, using one or more distance sensors of the computing system, distance data of the wrist of the user; and
generating the 3D parameter data based on the video frame tracking data and the distance data.

15. The computer-readable storage medium of claim 13, wherein generating the 3D parameter data further comprises:
generating feature map data including 3D coordinate data of visual features of the wrist of the user based on the video frame tracking data; and
generating intermediate 3D parameter vector data based on the feature map data.

16. The computer-readable storage medium of claim 13, wherein generating the 3D parameter data further comprises:
capturing, using one or more distance sensors of the computing system, distance data of the wrist of the user;
generating feature map data including 2D coordinate data of visual features of the wrist of the user based on the video frame tracking data; and
generating intermediate 3D parameter vector data based on the feature map data and the distance data.

17. The computer-readable storage medium of claim 13, wherein generating the 3D parameter data further comprises:
generating the 3D parameter data of the wrist of the user based on the video frame tracking data and a 3D parameter model generated using a combination of synthetic video frame tracking data and actual video frame tracking data.

* * * * *